US012574581B2

(12) United States Patent
Chen et al.

(10) Patent No.: US 12,574,581 B2
(45) Date of Patent: Mar. 10, 2026

(54) VIDEO STREAM BITRATE ADJUSTMENT METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Huacheng Chen, Shenzhen (CN); Hongzhan Zhang, Shenzhen (CN); Xu Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 63 days.

(21) Appl. No.: 18/604,602

(22) Filed: Mar. 14, 2024

(65) Prior Publication Data

US 2024/0223832 A1 Jul. 4, 2024

Related U.S. Application Data

(63) Continuation of application No. PCT/CN2023/111605, filed on Aug. 8, 2023.

(30) Foreign Application Priority Data

Sep. 7, 2022 (CN) .......................... 202211091363.1

(51) Int. Cl.
*H04N 21/2662* (2011.01)
*H04N 21/2187* (2011.01)
*H04N 21/24* (2011.01)
(52) U.S. Cl.
CPC ..... *H04N 21/2662* (2013.01); *H04N 21/2187* (2013.01); *H04N 21/2402* (2013.01)

(58) Field of Classification Search
CPC ........... H04N 21/2662; H04N 21/2187; H04N 21/2402; H04N 17/00; H04N 19/115; H04N 19/146; H04N 21/2343; H04N 17/004

(Continued)

(56) References Cited

U.S. PATENT DOCUMENTS

2012/0250762 A1 10/2012 Kaye et al.
2012/0307885 A1* 12/2012 Agarwal ............. H04W 72/569
375/E7.126
2021/0234632 A1* 7/2021 Low ...................... H04L 1/0041

FOREIGN PATENT DOCUMENTS

CN 104243102 A 12/2014
CN 110290402 A 9/2019
(Continued)

OTHER PUBLICATIONS

The World Intellectual Property Organization (WIPO) International Search Report for PCT/CN2023/111605 Dec. 1, 2023 6 Pages (including translation).

*Primary Examiner* — Adil Ocak
(74) *Attorney, Agent, or Firm* — Anova Law Group, PLLC

(57) ABSTRACT

A video stream bitrate adjustment method includes: in response to a playback request initiated by a terminal, transmitting, through a transmission link, a video stream transcoded according to a first bitrate to the terminal; detecting a first network state of the transmission link, and in response to determining based on the first network state that a bitrate adjustment is required, determining a second bitrate to be adjusted to, and performing multiple progressive adjustments, in a direction toward the second bitrate, on redundancy of video frames in the video stream transcoded according to the first bitrate; and acquiring second network states of the transmission link during the multiple progres- (Continued)

S302

In response to a playback request initiated by a terminal, transmit, through a transmission link, a video stream transcoded according to a first bitrate to the terminal

S304

Detect a first network state of the transmission link, and in response to determining based on the first network state that a bitrate adjustment is required, determine a second bitrate to be adjusted to, and perform multiple progressive adjustments, in a direction toward the second bitrate, on redundancy of video frames in the video stream transcoded according to the first bitrate

S306

Acquire second network states of the transmission link during the multiple progressive adjustments, and in a case that the second network states meet a network smoothness condition, transmit a video stream transcoded according to the second bitrate to the terminal sive adjustments, and in a case that the second network states meet a network smoothness condition, transmitting a video stream transcoded according to the second bitrate to the terminal.

20 Claims, 6 Drawing Sheets

(58) Field of Classification Search
 USPC ......................................................... 709/231
 See application file for complete search history.

(56) References Cited

FOREIGN PATENT DOCUMENTS

| | | | |
|---|---|---|---|
| CN | 112822521 | A | 5/2021 |
| CN | 113079103 | A | 7/2021 |
| CN | 113573101 | A | 10/2021 |
| WO | 2021179304 | A1 | 9/2021 |

* cited by examiner

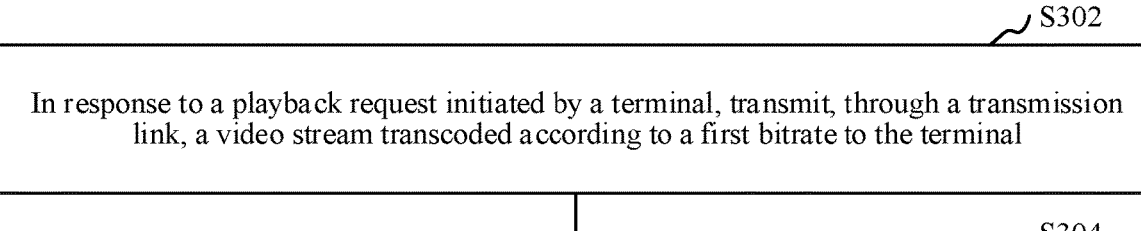

In response to a playback request initiated by a terminal, transmit, through a transmission link, a video stream transcoded according to a first bitrate to the terminal

S302

Detect a first network state of the transmission link, and in response to determining based on the first network state that a bitrate adjustment is required, determine a second bitrate to be adjusted to, and perform multiple progressive adjustments, in a direction toward the second bitrate, on redundancy of video frames in the video stream transcoded according to the first bitrate

S304

Acquire second network states of the transmission link during the multiple progressive adjustments, and in a case that the second network states meet a network smoothness condition, transmit a video stream transcoded according to the second bitrate to the terminal

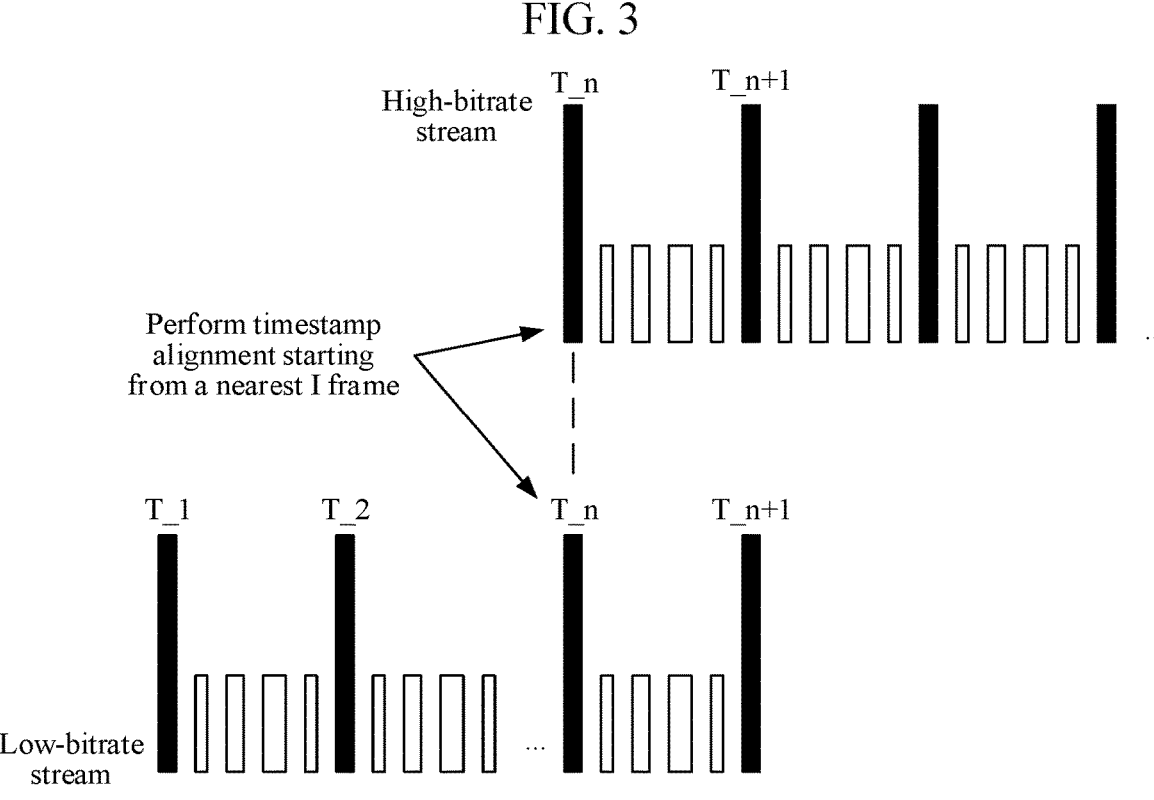

FIG. 4

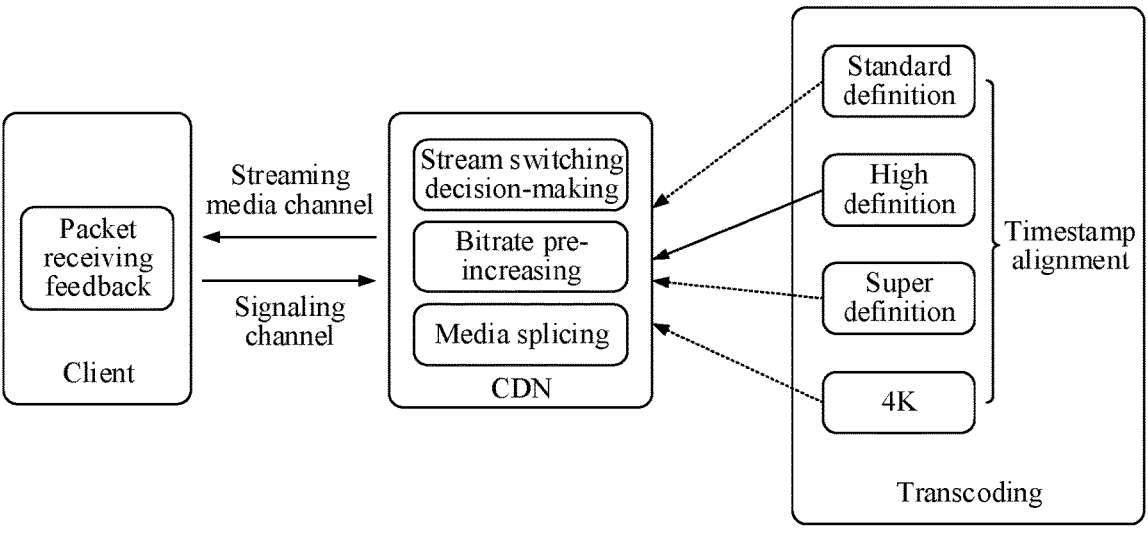
FIG. 5
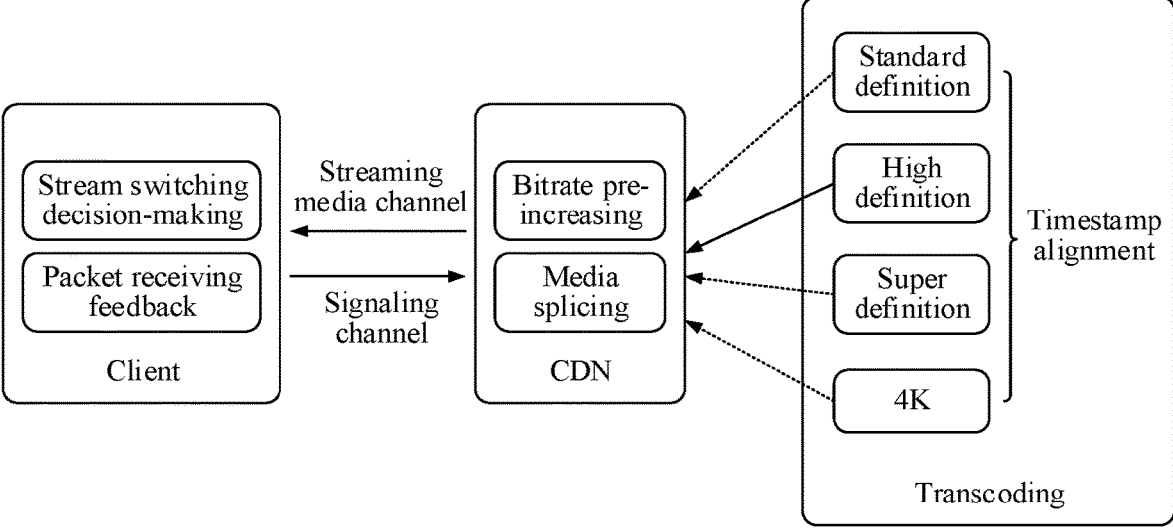
FIG. 6
FIG. 7

VIDEO STREAM BITRATE ADJUSTMENT METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2023/111605, filed on Aug. 8, 2023, which claims priority to Chinese Patent Application No. 2022110913631, entitled "VIDEO STREAM BITRATE ADJUSTMENT METHOD AND APPARATUS, COMPUTER DEVICE, AND STORAGE MEDIUM" filed with the Chinese Patent Office on Sep. 7, 2022, both of which are incorporated by reference in their entirety.

FIELD OF THE TECHNOLOGY

The present disclosure relates to the field of streaming media technologies, and in particular, to a video stream bitrate adjustment method and apparatus, a computer device, a storage medium, and a computer program product.

BACKGROUND OF THE DISCLOSURE

Currently, when a client starts playing back a video stream, a video bitrate may be selected by default, which is generally an original bitrate of the video stream. When the client encounters playback freezing during the playback of the video stream, a user needs to manually select a lower bitrate, to ensure smooth video playback. When the user wants to watch a video with higher image quality, the user also needs to manually select a higher bitrate.

A current video stream bitrate switching manner requires the user to make multiple attempts, a video playback performance (such as freezing) after each attempt to switch the bitrate is unpredictable, and it is difficult to guarantee accuracy of a bitrate adjustment.

SUMMARY

According to various embodiments provided in the present disclosure, a video stream bitrate adjustment method and apparatus, a computer device, a computer-readable storage medium, and a computer program product are provided.

According to one aspect, the present disclosure provides a video stream bitrate adjustment method. The method is performed by a computer device, including: in response to a playback request initiated by a terminal, transmitting, through a transmission link, a video stream transcoded according to a first bitrate to the terminal; detecting a first network state of the transmission link, and in response to determining based on the first network state that a bitrate adjustment is required, determining a second bitrate to be adjusted to; performing multiple progressive adjustments, in a direction toward the second bitrate, on redundancy of video frames in the video stream transcoded according to the first bitrate; and acquiring second network states of the transmission link during the multiple progressive adjustments, and in response to that the second network states meet a network smoothness condition, transmitting a video stream transcoded according to the second bitrate to the terminal.

According to another aspect, the present disclosure further provides a video stream bitrate adjustment apparatus. The apparatus includes: a response module configured to, in response to a playback request initiated by a terminal, transmit, through a transmission link, a video stream transcoded according to a first bitrate to the terminal; an adjustment module configured to detect a first network state of the transmission link, and in response to determining based on the first network state that a bitrate adjustment is required, determining a second bitrate to be adjusted to, and perform multiple progressive adjustments, in a direction toward the second bitrate, on redundancy of video frames in the video stream transcoded according to the first bitrate; a transmission module configured to acquire second network states of the transmission link during the multiple progressive adjustments, and in response to that the second network states meet a network smoothness condition, transmitting a video stream transcoded according to the second bitrate to the terminal.

According to another aspect, the present disclosure further provides a computer device. The computer device includes a memory and a processor, the memory stores computer-readable instructions, and the processor, when executing the computer-readable instructions, implements steps of the above video stream bitrate adjustment method.

According to another aspect, the present disclosure further provides a non-transitory computer-readable storage medium. The computer-readable storage medium stores computer-readable instructions, and the processor, when executing the computer-readable instructions, implements steps of the above video stream bitrate adjustment method.

Details of one or more embodiments of the present disclosure are provided in the accompanying drawings and descriptions below. Other features, objectives, and advantages of the present disclosure become apparent from the specification, the accompanying drawings, and the claims.

BRIEF DESCRIPTION OF THE DRAWINGS

FIG. 3 is a schematic flowchart of a video stream bitrate adjustment method according to an embodiment.

FIG. 4 is a schematic diagram of a principle of timestamp alignment according to an embodiment.

FIG. 5 is a schematic diagram of overall architecture according to an embodiment.

FIG. 6 is a schematic diagram of overall architecture according to another embodiment.

FIG. 7 is a schematic flowchart of bitrate pre-increasing according to an embodiment.

DESCRIPTION OF EMBODIMENTS

To make the objectives, technical solutions, and advantages of the present disclosure clearer, the following further describes the present disclosure in detail with reference to the accompanying drawings and embodiments. It is to be understood that specific embodiments described herein are only used for explaining the present disclosure, and are not used for limiting the present disclosure.

In a related technology, for example, a dynamic adaptive streaming over hyper text transfer protocol (HTTP) (Dash) manner, an HTTP live streaming (HLS) manner, a bitrate switching manner are all based on slicing of media data. Each media slice uses a group of picture (GOP, a complete set of decodable video frame sequences) as a minimum unit. When a video stream starts to be transmitted, a client first requests and downloads a media file from a server. The media file includes a list of slices and specific information of each slice. The client parses the media file to obtain slice information of the video stream, selects a media slice suitable for a current situation, extracts an address of the media slice, and initiates a request to the server through the address, so as to obtain a corresponding data stream. A sliced bitrate switching solution has a problem of large latency and cannot meet a high requirement for low latency in current scenes such as livestreaming.

In view of this, embodiments of the present disclosure provide a video stream bitrate adjustment method, which greatly reduces livestreaming delay and has higher real-time performance by using an adaptive bitrate adjustment manner for video livestreaming. With the method, a network state is detected, a bitrate is pre-increased when the network state permits, and whether to increase the bitrate is determined through feedback of the network state, which prevents poor user experience caused by freezing due to a blind increase in the bitrate, prevents repeated switching of the bitrate, and greatly improves accuracy of a bitrate adjustment.

Figures 1, 2:
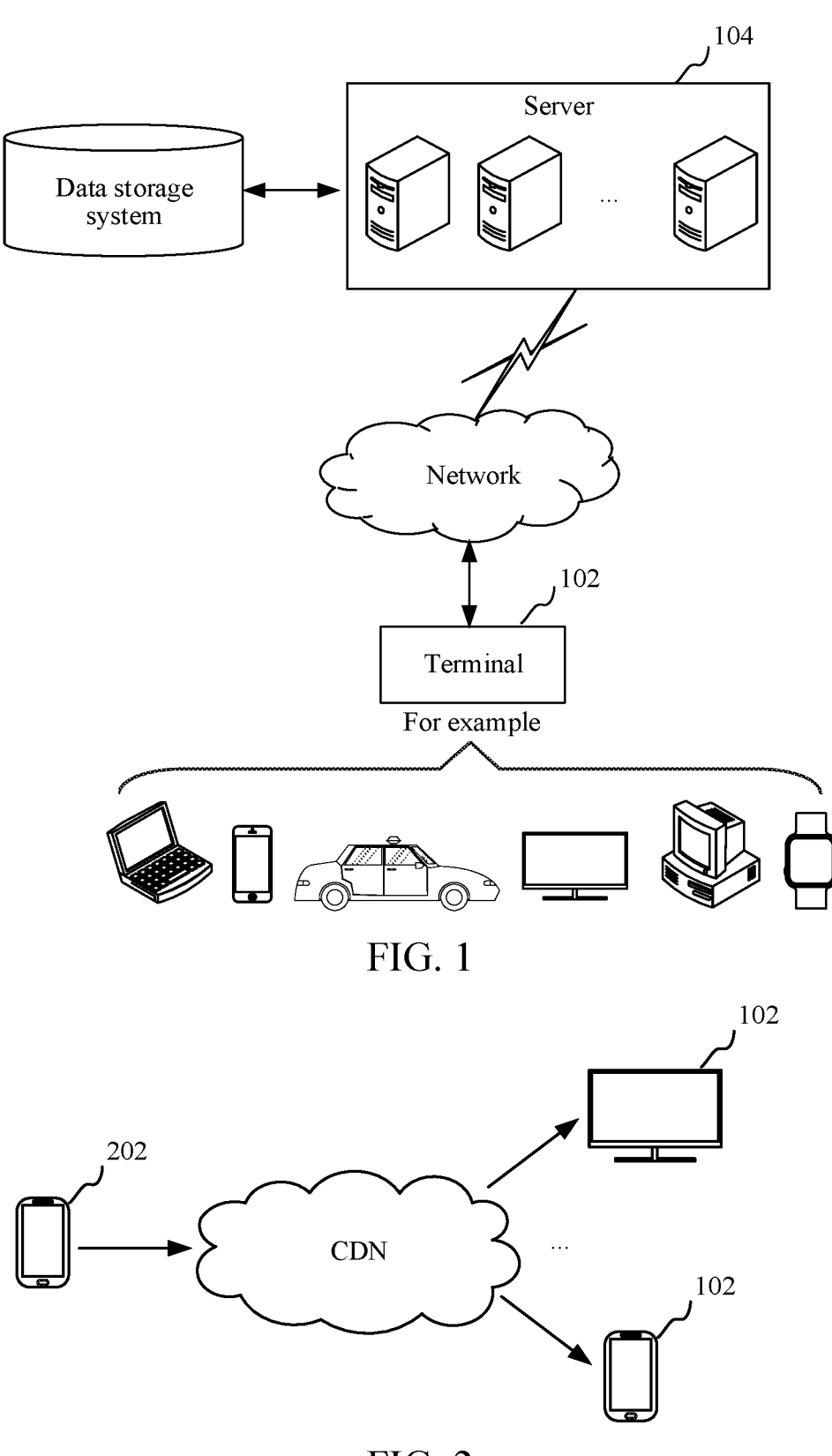
FIG. 1 is a diagram of an application environment of a video stream bitrate adjustment method according to an embodiment.
FIG. 2 is a diagram of an application environment of a video stream bitrate adjustment method according to another embodiment.

The video stream bitrate adjustment method provided in the embodiments of the present disclosure may be applied to an application environment shown in FIG. 1. A terminal 102 communicates with a server 104 by using a network. A data storage system may store data needing to be processed by the server 104. The data storage system may be integrated into the server 104 or placed on a cloud or other servers. The terminal 102 transmits a playback request to the server 104 in response to a trigger operation of a user. In response to the playback request, the server 104 acquires a video stream transcoded according to a first bitrate and transmits the video stream to the terminal 102 through a transmission link. Based on the transmission link, the terminal 102 acquires, in real time, the video stream transcoded according to the first bitrate and plays back the video stream. When the terminal 102 plays back the video stream transcoded according to the first bitrate, the server 104 detects a network state (also referred to as first network state) of the transmission link, and in response to determining based on the network state that a bitrate adjustment is required, determines a second bitrate needing to be adjusted to, and performs multiple progressive adjustments, in a direction toward the second bitrate, on redundancy of video frames in the video stream transcoded according to the first bitrate. At the same time, the server 104 acquires network states (also referred to as second network states) of the transmission link during the multiple progressive adjustments, and in a case that the acquired network states meet a network smoothness condition, the server 104 transmits a video stream transcoded according to the second bitrate to the terminal 102.

The terminal 102 may be, but is not limited to, one or more of various desktop computers, notebook computers, smart phones, tablet computers, Internet of Things devices, portable wearable devices, and the like. The Internet of Things devices may be one or more of smart speakers, smart televisions, smart air conditioners, smart in-vehicle devices, and the like. The portable wearable devices may be one or more of smart watches, smart bracelets, head-mounted devices, and the like.

In some embodiments, the terminal may be loaded with applications (APPs) or APPs with video playback functions, including APPs needing to be installed separately and mini program APPs that can be used without downloading and installing, such as one or more of a browser client, a web client, and stand-alone APP clients. The terminal may acquire the video stream transmitted by the server through an APP and play back the video stream, for example, watch a video or livestreaming. The terminal may manually perform bitrate switching through an APP or the server may perform bitrate switching by selecting an adaptive bitrate.

The server 104 may be a stand-alone physical server, may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

A CDN technology is a method of distributing content from a central server to an edge server close to the user, so as to achieve distributed and nearby access to the content. The CDN technology effectively improves quality of service (QoS) of content access and supports large-scale concurrent access capabilities.

In some embodiments, an application environment to which the present disclosure is applicable may be shown in FIG. 2, including a collection end 202 configured to collect video streams, a CDN, and a client 102 configured to play back the video streams. The CDN is network architecture provided by a server cluster or a distributed system formed by a plurality of content delivery servers. The content delivery servers in the CDN may establish communication connections with each other to achieve data interaction. The collection end 202 collects video streams and pushes the video streams to the content delivery server. The content delivery server caches the video streams and forwards the video streams to one or more terminals 102. The collection end may be a terminal configured to collect video streams. The CDN may further include a source station. The source station may be configured to store original video streams collected by the collection end. When the content delivery server does not cache video stream resources or cached video stream resources have expired, the content delivery server may go back to the source station to acquire resources to return acquired video streams to the terminal.

In some embodiments, architecture of the CDN may further include a transcoding server. The transcoding server may be any server in the server cluster or the distributed system formed by the plurality of content delivery servers, and may be configured to transcode the video stream with an original bitrate to output a plurality of video streams with different definition. In another embodiment, a transcoding function may alternatively be integrated into the content delivery server to transcode the video stream through a transcoding service provided by the content delivery server or another content delivery server.

In some embodiments, as shown in FIG. 3, a video stream bitrate adjustment method is provided. For example, the method is applied to the server in FIG. 1, and the server may be a content delivery server. The method includes the following steps:

Step S302: In response to a playback request initiated by a terminal, transmit, through a transmission link, a video stream transcoded according to a first bitrate to the terminal.

This embodiment of the present disclosure is applicable to application scenes such as video playback and livestreaming. In the video playback scene, the terminal transmits a playback request to the server, and the server parses the playback request to acquire a corresponding video transcoded according to the first bitrate and transmits the video transcoded according to the first bitrate to the terminal for playback. The first bitrate may be a default video bitrate, or may be a video bitrate carried in the playback request, so as to transmit the video stream transcoded according to the first bitrate to the terminal. In the livestreaming scene, the collection end collects an original video stream transcoded according to the first bitrate and uploads the original video stream to the CDN, the content delivery server caches and distributes the original video stream to each terminal, and the terminal plays back, through the client, the video stream transcoded according to the first bitrate.

In some embodiments, the client is preset with a plurality of bitrate levels, and each bitrate level corresponds to a corresponding preset bitrate. Different bitrate levels correspond to different video definition. For example, the bitrate levels include, but are not limited to, various corresponding preset bitrates such as 360 Kbps, 550 Kbps, 1200 Kbps, and 2000 Kbps, and the corresponding video definition is, for example, smooth, standard definition, high definition, and 2 k.

Specifically, the terminal generates the playback request in response to a trigger operation of a user, and transmits the playback request to the server. After receiving the playback request transmitted by the terminal, the server transmits the corresponding video stream transcoded according to the first bitrate to the terminal. In the livestreaming scene, the server may establish a transmission link with the terminal to transmit, through the transmission link, the video stream transcoded according to the first bitrate to the terminal. On the other hand, the server parses the playback request to determine a specific video or video stream requested to be played back, and transmits the specific video or video stream to the terminal. Taking the livestreaming scene as an example, after the server establishes the transmission link with the terminal, the server may continuously transmit the video stream transcoded according to the first bitrate to the terminal, and the terminal may watch livestreaming content in real time.

The transmission link refers to a data transmission channel established by the terminal and the server. Through the transmission link, pushing and delivery of video streams, uploading of requests, and result feedback after execution of the requests may be realized. In some embodiments, the transmission link includes at least a streaming media channel and a signaling channel. The streaming media channel is used for transmitting media data of the video streams, and the signaling channel is used for transmitting requests and responses between the terminal and the server.

The playback request carries at least a source identifier corresponding to the video stream requested to be played back. The source identifier is used for referring to a specific video stream, so as to be distinguished from other video streams. The source identifier may be represented in one or more manners such as address linking or string encoding. However, the present disclosure is not limited thereto. For example, the playback request may further carry a playback bitrate. The playback bitrate may be one of a default bitrate set each time the client installed on the terminal starts playing back the video stream, a bitrate when the user last watched a video or livestreaming through the client, and a bitrate selected when the user plays back the video stream this time. The playback bitrate may be a bitrate corresponding to a certain bitrate level in the plurality of preset bitrate levels. The playback bitrate carried in the playback request may be determined to be the first bitrate, so that the video stream transcoded according to the first bitrate is transmitted to the terminal.

Correspondingly, in some embodiments, the server, after receiving the playback request transmitted by the terminal, parses the playback request to acquire the playback bitrate carried therein, and determines the playback bitrate to be the first bitrate, and the server acquires a video stream transcoded according to the playback bitrate, and transmits the video stream transcoded according to the playback bitrate to the terminal for playback. The video stream transcoded according to the playback bitrate may be obtained by transcoding the original video stream with the original bitrate.

Step S304: Detect a network state of the transmission link, and in response to determining based on the network state that a bitrate adjustment is required, determine a second bitrate needing to be adjusted to, and perform multiple progressive adjustments, in a direction toward the second bitrate, on redundancy of video frames in the video stream transcoded according to the first bitrate.

When the terminal plays back the video stream transcoded according to the first bitrate, the terminal or the server may detect the network state of the transmission link at a certain frequency to determine whether the bitrate adjustment is required. The bitrate adjustment includes, but is not limited to, increasing the bitrate, keeping the bitrate unchanged, and decreasing the bitrate. A detection frequency may be set according to an actual requirement. The network state may be determined based on one or more of a rate, a bandwidth, delay, latency bandwidth product, a packet loss rate, and throughput of the transmission link. When it is determined that the bitrate adjustment is required, the second bitrate needing to be specifically adjusted to is determined, and bitrate adjustment processing is performed according to a direction toward the second bitrate. The second bitrate may be a target bitrate needing to be adjusted to. When the bitrate is decreased, a value of the second bitrate is less than that of the first bitrate. When the bitrate is increased, the value of the second bitrate is greater than that of the first bitrate.

In some embodiments, when the terminal plays back the video stream at the first bitrate through the client, if there are no situations such as freezing and frame dropping, a current network state is considered to be good. In this case, the good network state may be a state where stable playback of the video stream transcoded at the first bitrate can be just satisfied. That is, if the bitrate is increased, the network state may be unstable, which may lead to freezing or other situations. Alternatively, the good network state may be a state where fluent video playback can be ensured even after the bitrate is increased. That is, the network state still has room to accommodate higher-bitrate video streams. Therefore, in a case that the current network state is good, it may be determined that bitrates of video streams subsequently transmitted need to be increased, so as to provide optimal QoS when the network state provides support and greatly improve quality of experience (QoE) of viewers.

In another embodiment, when the terminal plays back the video stream at the first bitrate through the client, the terminal plays back the video stream transcoded according to the first bitrate, and if there are no situations such as freezing and frame dropping, it means that the current network state is poor and the bitrates that can be accommodated in the transmission link are limited. Therefore, in a case that the current network state is limited, it may be determined that the bitrates of the video streams subsequently transmitted need to be decreased to eliminate freezing, thereby ensuring QoE of the viewers.

In some embodiments, the terminal detects the network state of the transmission link during the playback of the video stream transcoded according to the first bitrate. Correspondingly, when the terminal determines according to the network state of the transmission link that the bitrate adjustment is required, the terminal transmits a request to the server to cause the server to perform a video stream bitrate adjustment step.

In another embodiment, when the terminal plays back the video stream transcoded according to the first bitrate, the server detects the network state of the transmission link. Correspondingly, when the server determines according to the network state of the transmission link that the bitrate adjustment is required, the video stream bitrate adjustment step is automatically performed.

When determining based on the network state of the transmission link that the bitrate adjustment is required, the server may determine the second bitrate needing to be adjusted to, and perform multiple progressive adjustments, in a direction toward the second bitrate, on redundancy of video frames in the video stream transcoded according to the first bitrate, which may specifically adjust redundancy of at least one video frame in the video stream transcoded according to the first bitrate. For example, the redundancy may be increased to increase an instantaneous bitrate in the video stream transcoded at the first bitrate, or the redundancy may be decreased to decrease the instantaneous bitrate in the video stream transcoded at the first bitrate.

Specifically, when the terminal plays back the video stream transcoded at the first bitrate, in response to determining based on the network state of the transmission link that the bitrate adjustment is required, the server may adjust the redundancy of the video frames transmitted to the terminal, attempt to pre-increase the bitrate in the direction toward the second bitrate, and acquire a change in the network state of the transmission link, which may be detected by the terminal, obtained by the server by receiving feedback from the terminal, or directly detected by the server. In a case that the network state is still good, the redundancy of the video frames is adjusted again, a change in the network state of the transmission link is acquired again, . . . . Therefore, multiple progressive adjustments are performed on the redundancy until a bitrate corresponding to the adjusted video frames matches the second bitrate to be adjusted to. For example, when the bitrate corresponding to the adjusted video frames reaches the second bitrate, the bitrate adjustment step is stopped.

The second bitrate may be a preset bitrate corresponding to any one of the plurality of preset bitrate levels. The second bitrate may be a bitrate corresponding to a bitrate level that is one level higher (or lower) than the first bitrate, or may be a bitrate corresponding to a bitrate level that is two or more levels higher (or lower) than the first bitrate. For example, assuming that the first bitrate is currently 550 Kbps (corresponding to standard definition), during the bitrate increase, the second bitrate may be 1200 Kbps, 2000 Kbps, or the like. During the bitrate decrease, the second bitrate may be 480 Kbps, 360 Kbps, or the like.

Redundancy of the video frame corresponds to bitrates of the video frame. For example, for an original video frame, 800 original packets need to be transmitted during transmission, which corresponds to a bitrate A. After 600 redundant packets are added, the video frame corresponds to a bitrate B. After 1000 redundant packets are added, the video frame corresponds to a bitrate C (A<B<C). The redundant packets are data packets used for increasing the redundancy of the video frame. Taking the bitrate increase as an example, the redundancy of the video frames are progressively increased multiple times, the redundancy is continuously increased when it is determined, by detecting the network state after each adjustment, that the transmission link can bear a corresponding bitrate, . . . until the bitrate corresponding to the video frames reaches the second bitrate after a certain adjustment.

In some embodiments, the server may increase the redundancy of the video frames by redundancy encoding, so as to detect a change in the network state caused by a change in the bitrate. The redundancy encoding includes, but is not limited to, forward error correction (FEC) redundancy encoding, and the like. The FEC redundancy encoding includes, but is not limited to, one or more of hamming encoding, Reed-Solomon codes (RS) encoding, convolutional code, and the like. For example, the server may introduce redundant packets when compressing and encoding the video frames, and encapsulate data packets originally corresponding to the video frames and the redundant packets into messages for transmission. The redundancy of the video frames may be adjusted by adjusting a quantity of the redundant packets. Taking RS encoding as an example, the video frames originally correspond to k data packets, and the server may generate m redundant packets and use a k*m transformation matrix (such as a Van der Monte matrix) to obtain FEC data including redundant data.

To prevent freezing of the video played back by the terminal caused by an impact on a network when the bitrate is increased and impossible bearing of the increased bitrate by the transmission link, during the bitrate adjustment by the server, the adjustment between each two adjacent bitrate levels is performed progressively multiple times. During the multiple adjustments, in some embodiments, the redundancy in each adjustment may be the same. For example, 500 redundant packets are added each time, or the redundancy is increased by 20% each time. Alternatively, the redundancy in each adjustment may be different. For example, 100 redundant packets are added for the first time, 300 redundant packets are added for the second time, . . . or the redundancy is increased by 10% for the first time, increased by 20% for the second time, and so on. In a case that the redundancy in each adjustment is different, the redundancy adjusted by the server each time may change regularly, for example, change arithmetically or geometrically. The redundancy adjusted each time may alternatively change irregularly. For example, the server may adjust next redundancy in real time according to the network state.

In some embodiments, when it is determined based on the network state of the transmission link that a bitrate decrease is required, indicating that the current network state is limited, there is no need to perform multiple adjustments between each two adjacent bitrate levels progressively, and one or more levels may be directly lowered in the plurality of preset bitrate levels. For example, the server may lower one level, may lower another level when the network state is still poor, . . . until the target bitrate is reached. During the progressive adjustments, the server does not change an actual bitrate of the original video stream, but indirectly achieves a required bitrate through redundancy.

Step S306: Acquire network states of the transmission link during the multiple progressive adjustments, and in a case that the acquired network states meet a network smoothness condition, transmit a video stream transcoded according to the second bitrate to the terminal.

In some embodiments, during the multiple progressive adjustments of the redundancy of the video frames in the video stream transcoded according to the first bitrate, in a case that the network state of the transmission link after each adjustment meets the network smoothness condition, the server transcodes a video stream subsequently transmitted into the second bitrate, aligns timestamps of the video stream transcoded at the second bitrate with the video stream transcoded at the first bitrate to complete a media splicing process, and subsequently transmits the video stream transcoded according to the second bitrate to the terminal, thereby achieving smooth and seamless switching from the original bitrate to the second bitrate. Alternatively, after determining the adjustment to the second bitrate, the server pulls a stream to the source station to acquire the video stream transcoded according to the second bitrate, and aligns the timestamps to achieve bitrate switching.

In some embodiments, during the multiple progressive adjustments, in a case that a number of times it is detected that the network state of the transmission link meets the network smoothness condition is higher than a number of times it is detected that the network smoothness condition is not met (i.e., a number of the second network states meeting the network smoothness condition is higher than a number of second network states not meeting the network smoothness condition), the server may transcode the video stream into the second bitrate and transmit the video stream to the terminal, that is, transmit the video stream transcoded according to the second bitrate to the terminal.

In some embodiments, during the multiple progressive adjustments, in a case that the number of times it is detected that the network state of the transmission link meets the network smoothness condition (i.e., a number of the second network states meeting the network smoothness condition) reaches a preset threshold, the server may transcode the video stream into the second bitrate and transmit the video stream to the terminal, that is, transmit the video stream transcoded according to the second bitrate to the terminal.

In the above video stream bitrate adjustment method, in response to the playback request initiated by the terminal, the video stream transcoded according to the first bitrate is transmitted to the terminal through the transmission link, the network state of the transmission link is detected, in response to determining based on the network state that the bitrate adjustment is required, the second bitrate needing to be adjusted to is determined, and multiple progressive adjustments are performed, in the direction toward the second bitrate, on the redundancy of the video frames in the video stream transcoded according to the first bitrate, the network states of the transmission link during the multiple progressive adjustments are acquired, and in a case that the acquired network states meet the network smoothness condition, the video stream transcoded according to the second bitrate is transmitted to the terminal. Therefore, by adaptively adjusting a stream bitrate according to a detected network environment condition, the QoS can be improved under a limited network condition and QoE of the viewers can be greatly improved. Moreover, it is detected in this process whether the network state meets the network smoothness condition, and in a case that the network smoothness condition is met during the progressive adjustments on the redundancy, the video stream is transcoded into the second bitrate and then transmitted to the terminal, which prevents freezing caused by a blind increase in the bitrate, prevents repeated switching of the bitrate, and greatly improves accuracy of the bitrate adjustment.

On the other hand, steps of stream switching and stream splicing are front-loaded to the server, which can reduce end-to-end delay and reduce outflow costs of the client and the server. At the same time, this prevents a need for the client to pull the video stream with a new bitrate while maintaining transmission of the video stream with the original bitrate during the stream switching, thereby resulting in significant consumption of a transmission bandwidth. Moreover, when a network condition is poor, it is likely to further aggravate the freezing at a moment when the client performs the stream switching, which affects playback experience. In the video stream bitrate adjustment method in this embodiment of the present disclosure, actions of stream switching and stream splicing are performed by the server, which prevents a sudden increase in bandwidth consumption caused by pulling two streams at the same time during the stream switching, reduces a probability of freezing of the stream switching, and saves bandwidth costs.

In some embodiments, the in response to a playback request initiated by a terminal, transmitting, through a transmission link, a video stream transcoded according to a first bitrate to the terminal includes: in response to the playback request initiated by the terminal, acquiring, based on the first bitrate carried in the playback request, the video stream transcoded according to the first bitrate; where the first bitrate is a preset bitrate corresponding to a preset bitrate level; and transmitting the video stream transcoded according to the first bitrate to the terminal through the transmission link.

Specifically, the collection end collects an original video stream and transmits the original video stream to the server. Taking the livestreaming scene as an example, when a live stream host starts livestreaming, the original video stream with the original bitrate is pushed to the CDN. The content delivery server in the CDN may perform processing such as caching. When the user wants to watch a video, a playback request may be triggered and generated through the client, and the corresponding terminal transmits the playback request to the content delivery server to request stream pulling. That is, the terminal acquires, in response to a trigger operation of the user, a first bitrate of a to-be-played-back video stream, and encapsulates the first bitrate into a message to generate a playback request.

The server parses the playback request, and acquires, according to the first bitrate carried in the playback request, a video stream transcoded according to the first bitrate. The server may acquire the video stream transcoded according to the first bitrate in the following manner: The server transcodes a video stream with an original bitrate to obtain a video stream with the first bitrate, that is, the video stream transcoded according to the first bitrate, or the server pulls a stream to the source station to obtain the video stream transcoded according to the first bitrate, or the server requests transcoding from the transcoding server and the transcoding server transcodes the video stream with the original bitrate to obtain the video stream transcoded according to the first bitrate.

In the above embodiments, when the terminal requests playing back a video stream, a video stream at a corresponding bitrate is acquired based on the first bitrate required by the terminal and is transmitted to the terminal. The first bitrate is a corresponding preset bitrate in the preset bitrate levels, and relevant encoding parameters have been set in advance, so that transcoding and transmission can be quickly realized, and a response is made fast.

In some embodiments, the acquiring the video stream transcoded according to the first bitrate includes: acquiring a video stream with an original bitrate, adjusting an encoding parameter in the video stream with the original bitrate based on the first bitrate, and transcoding the video stream with the original bitrate to obtain the video stream transcoded according to the first bitrate.

The original bitrate refers to an initial bitrate when the video stream is generated. The video stream is transcoded, and video streams transcoded according to different bitrates may be obtained. The video streams transcoded according to different bitrates have different video screen definition. A higher bitrate corresponds to higher video screen definition. Specifically, when the server performs transcoding, a specific transcoding manner includes: when the server encodes and decodes the video stream, adjusting encoding parameters of the video frames in the video stream, specifically adjusting encoding parameters in the video stream with the original bitrate based on the first bitrate to transcode the video stream with the original bitrate, so as to transcode the video stream with the original bitrate to obtain a video stream corresponding to the first bitrate. The encoding parameters include, but are not limited to, one or more of video resolution, bitrates, and the like. A specific encoding manner includes, but is not limited to, H.264/H.265 (video compression encoding standard) and other video encoding manners.

In the above embodiments, the server transcodes the video stream to quickly obtain a video stream with a corresponding bitrate, so that a most appropriate bitrate can be selected based on a network situation to take both playback fluency and screen quality into account.

In some embodiments, the acquiring the video stream transcoded according to the first bitrate includes: transmitting a transcoding request to a transcoding server, the transcoding request being used for instructing the transcoding server to provide the video stream transcoded according to the first bitrate; and receiving the video stream transcoded according to the first bitrate and transmitted by the transcoding server.

The transcoding server is a server configured to perform bitrate conversion for video streams. The server may transmit a request to the transcoding server, and the transcoding server transcodes the video stream with the original bitrate according to the request and returns the video stream corresponding to the first bitrate and obtained by transcoding to the server. The server may transmit a transcoding request to the transcoding server to instruct the transcoding server to provide the video stream transcoded according to the first bitrate, that is, instruct the transcoding server to transmit the video stream transcoded according to the first bitrate to the server. The server may receive the video stream transcoded according to the first bitrate and transmitted by the transcoding server.

In the above embodiments, the transcoding server transcodes the video stream to quickly obtain a video stream with a corresponding bitrate, so that a most appropriate bitrate can be selected based on a network situation to take playback fluency and screen quality into account.

The network state of the transmission link may be detected by the terminal or the server. For example, the terminal detects the network state of the transmission link. In some embodiments, the detecting a network state of the transmission link includes: receiving a feedback message transmitted by the terminal; the feedback message carrying network state information; extracting network state information of the transmission link from the feedback message; and determining the network state of the transmission link according to the network state information.

Specifically, when the terminal plays back the video stream, the terminal detects the network state of the transmission link to obtain the network state information, encapsulates the network state information into a feedback message, and transmits the feedback message to the server. The network state information includes, but is not limited to, one or more of an arrival time of a real-time transport protocol (RTP) message, a packet loss rate, a link bandwidth, and a congestion signal. The feedback message may include, but is not limited to, a message feeding back the arrival time of the RTP message (e.g., a transport-wide congestion control (Transport-CC) message), a message feeding back RTP packet receiving statistics, a message requesting I frames, and a negative acknowledgements (NACK) message, which may be a standard web real-time communications (WebRTC) real-time control protocol (RTCP) message or a private message.

Therefore, the server receives the feedback message transmitted by the terminal, parses the feedback message and extracts the network state information of the transmission link, and determines the network state of the transmission link according to the network state information, so as to determine whether the bitrate adjustment is required.

For example, the server evaluates a bandwidth capacity of the transmission link through the feedback message, so as to provide decisions for subsequent bitrate adjustments. A manner of evaluating the bandwidth capacity includes, but is not limited to, one or more of a standard WebRTC Google congest control (GCC) algorithm, a bottleneck bandwidth and round-trip propagation time (BBR) algorithm, and a meta-reinforcement learning algorithm. An evaluation result of the bandwidth capacity may be used for reference to determine which bitrate the bitrate is adjusted to. For example, in the plurality of preset bitrate levels, the bitrate may be decreased by one or more levels or increased by one or more levels according to the evaluation result of the bandwidth capacity.

In the above embodiments, the server extracts the network state information from the feedback message transmitted by the terminal, to determine the network state of the transmission link and determine whether a bitrate adjustment is required, which can adaptively adjust the bitrate of the video stream according to a network situation, and can adaptively improve screen quality while ensuring fluent viewing, take both screen quality and fluency into account, and improve viewing experience.

For example, the server detects the network state of the transmission link. In some embodiments, the detecting a network state of the transmission link includes: determining, in response to receiving a bitrate adjustment request transmitted by the terminal, the network state of the transmission link according to the bitrate adjustment request; where the bitrate adjustment request is generated in a case that the terminal detects that network state information meets a bitrate adjustment condition, the network state information being detected by the terminal during playback of the video stream transcoded according to the first bitrate.

Specifically, when the terminal plays back the video stream transcoded according to the first bitrate, the network state of the transmission link is detected to obtain the network state information, and it is determined, according to whether the network state information meets the bitrate adjustment condition, whether a bitrate adjustment is required. The bitrate adjustment condition is, for example, one or more of the following: mismatching between a bandwidth capacity and a current bitrate (such as too large or too small), existence of a packet loss, detection of a congestion signal, and playback freezing.

When the terminal determines that a bitrate adjustment is required, for example, when it is detected that the bandwidth capacity is limited or the playback freezes, the terminal transmits the bitrate adjustment request to the server. The bitrate adjustment request may carry the network state information, so that the server may determine the network state of the transmission link according to the network state information in the bitrate adjustment request. In addition, the bitrate adjustment request may carry a current first bitrate. When receiving the bitrate adjustment request, the server may determine that the bitrate adjustment is required.

For example, during the playback of the video stream, when the terminal senses that the network capacity is limited or the playback freezes, the server is requested to decrease the bitrate through the signaling channel to increase a freezing rate. For example, an HTTP request or an RTCP request may be transmitted. When the terminal senses that the network capacity is increased or the playback freezing is restored, the server is requested, through the signaling channel, to increase the bitrate to improve image quality.

In the above embodiments, the terminal detects the network state of the transmission link and transmits a request to the server when a bitrate adjustment is required, to instruct the server to perform the bitrate adjustment, which can adaptively adjust the bitrate of the video stream according to a network situation and a playback situation, and can adaptively improve image quality while ensuring viewing fluency, take both screen quality and fluency into account, prevent occupation of more resources supporting a network playback function caused by freezing, and improve resource utilization.

In some embodiments, the in response to determining based on the network state that a bitrate adjustment is required, determining a second bitrate needing to be adjusted to, and performing multiple progressive adjustments, in a direction toward the second bitrate, on redundancy of video frames in the video stream transcoded according to the first bitrate includes: in response to determining based on the network state of the transmission link that a bitrate increase is required, determining the second bitrate needing to be increased to, and increasing, in the direction toward the second bitrate, the redundancy of the video frames in the video stream transcoded according to the first bitrate; transmitting the video frames with the increased redundancy to the terminal; and acquiring a latest network state of the transmission link, and in a case that the latest network state meets the network smoothness condition, continuously increasing, in the direction toward the second bitrate, the redundancy of the video frames in the video stream transcoded according to the first bitrate until the latest network state does not meet the network smoothness condition, or a bitrate corresponding to the video frames with the increased redundancy reaches the second bitrate.

When determining based on the network state of the transmission link that a bitrate increase is required, the server determines the second bitrate needing to be increased to. For example, based on a bitrate level of the first bitrate, a preset bitrate corresponding to a high bitrate level which is a higher bitrate level is determined from the preset bitrate levels, and the preset bitrate corresponding to the high bitrate level is determined to be the second bitrate. The second bitrate is greater than the first bitrate. The server increases, in the direction toward the second bitrate, the redundancy of the video frames in the video stream transcoded according to the first bitrate. The server may transmit the video frames with the increased redundancy to the terminal, and acquire a latest network state of the transmission link. In a case that the latest network state meets the network smoothness condition, the server continuously increases, in the direction toward the second bitrate, the redundancy of the video frames in the video stream transcoded according to the first bitrate, so as to progressively increase the redundancy until the latest network state does not meet the network smoothness condition, or a bitrate corresponding to the video frames with the increased redundancy reaches the second bitrate, and the server stops increasing the redundancy.

In the above embodiments, the redundancy of the video frames in the video stream transcoded according to the first bitrate is increased, the video frames with the increased redundancy are transmitted to the terminal, and the redundancy is increased multiple times when the latest network state meets the network smoothness condition, which can progressively increase the redundancy multiple times, prevent freezing caused by a blind increase in the bitrate, prevent repeated switching of the bitrate, and greatly improve accuracy of the bitrate adjustment.

In some embodiments, the increasing the redundancy of the video frames in the video stream transcoded according to the first bitrate includes: determining, from an initial key frame not transmitted in the video stream transcoded according to the first bitrate, a plurality of video frames starting from the initial key frame; and adjusting redundancy encoding parameters of the plurality of video frames in an adjustment manner of increasing redundancy, to obtain the video frames with the increased redundancy.

Specifically, the server may determine the plurality of video frames, whose redundancy needs to be increased, from the video stream transcoded according to the first bitrate, and adjust the redundancy encoding parameters of the plurality of video frames in the adjustment manner of increasing redundancy, so as to increase the redundancy for the plurality of video frames to obtain the video frames with the increased redundancy. Specifically, the server may find a first key frame (I frame) from the video stream transcoded according to the first bitrate and has not been transmitted, and determine subsequent frames starting from the frame. The key frame and the subsequent frames are the plurality of video frames whose redundancy is to be increased. The video frames are used for increasing the redundancy to detect an influence of a bitrate change on the network state. To prevent effects such as freezing and black screen on video playback, a quantity of the video frames needs to be less than that of a group of GOPs. Generally, three to five video frames following the I frame may be selected to adjust the redundancy.

The server first adjusts the redundancy encoding parameter of each of the plurality of video frames to increase the redundancy of the video frames, and transmits the plurality of video frames with the adjusted redundancy encoding parameters to the terminal. Then, the server acquires the latest network state of the transmission link. Assuming that the latest network state of the transmission link still meets the network smoothness condition after the redundancy is increased, the server continuously finds a next key frame, determines a plurality of video frames, and increases redundancy of the video frames, . . . until bitrates corresponding to the video frames after multiple adjustments reach the target bitrate. In each adjustment, the adjusted redundancy may be the same or different. At the same time, a quantity of video frames selected in each adjustment may also be the same or different. For example, after the target bitrate is reached, a decision-making cycle may be observed before the server officially starts to increase the bitrate. The decision-making cycle is generally 3-5 round-trip time (RTT).

In the above embodiments, multiple progressive adjustments are performed on the redundancy of the video frames, the network state is detected in each adjustment, and the bitrate is officially increased during bitrate pre-increasing, thereby preventing freezing caused by a blind increase in the bitrate, preventing repeated switching of the bitrate, and greatly improving accuracy of the bitrate adjustment.

In some embodiments, the method further includes: during the multiple progressive adjustments on the redundancy of the video frames, in response to detecting that at least one of the network states of the transmission link does not meet the network smoothness condition, stopping adjusting the redundancy of the video frames, and keeping transmitting the video stream transcoded according to the first bitrate to the terminal.

Specifically, when the server performs multiple progressive adjustments on the redundancy of the video frames, after each adjustment on the redundancy, the server may determine the latest network state of the transmission link according to the acquired network state information to determine an influence of the bitrate adjustment on the network state. When it is detected at any moment that the network state of the transmission link (which may be obtained by detection by the client and by parsing the feedback message received by the server) does not meet the network smoothness condition, the server stops adjusting the redundancy of the video frames and exits the bitrate adjustment process. In this case, the server controls the bitrate of the video stream transmitted to the terminal to remain unchanged, which is still the previous first bitrate, that is, keeps transmitting the video stream transcoded according to the first bitrate to the terminal.

In the above embodiments, during the multiple progressive adjustments on the redundancy of the video frames, if it is detected that the network state does not meet the network smoothness condition, the bitrate adjustment process may be exited, thereby maximizing the fluency of the video playback and improving viewing experience of the user.

In some embodiments, the in a case that the acquired network states meet a network smoothness condition, transmitting a video stream transcoded according to the second bitrate to the terminal includes: transmitting, in a case that a number of times it is detected that the network state of the transmission link meets the network smoothness condition is higher than a number of times it is detected that the network state does not meet the network smoothness condition, the video stream transcoded according to the second bitrate to the terminal.

Specifically, during the multiple progressive adjustments, the server detects whether the network state of the transmission link meets the network smoothness condition in each adjustment through detection or in a manner of transmitting a feedback message by the terminal. When the number of times the network smoothness condition is met is higher than the number of times the network smoothness condition is not met, the server converts the video stream into the target bitrate and transmits the video stream to the terminal. For example, during an adjustment from a current playback bitrate to the target bitrate, the server may predetermine a total number of adjustments required after the redundancy of each adjustment is set. During the entire adjustment, the server determines that a number of times the network smoothness condition is met and a number of times the network smoothness condition is not met after the adjustment, and determines accordingly whether to finally adjust the bitrate to the target bitrate. Specifically, the server may compare the number of times it is detected that the network state of the transmission link meets the network smoothness condition with the number of times it is detected that the network state does not meet the network smoothness condition, and in a case that the number of times the network smoothness condition is met is higher than the number of times the network smoothness condition is not met, the server may determine that bitrate switching can be performed, and the server transmits the video stream transcoded according to the second bitrate to the terminal.

In the above embodiments, during the multiple progressive adjustments, it is determined, according to the number of times the network state meets the network smoothness condition, whether to make an adjustment to the second bitrate, and when the number of times the network state meets the network smoothness condition is greater, it indicates that the number of times the network smoothness condition is not met may be caused by short-term network fluctuations, and an attempt of adjustment to the second bitrate may be made to provide high-quality or high-fluency viewing experience as much as possible.

In some embodiments, the in a case that the acquired network states meet a network smoothness condition, transmitting a video stream transcoded according to the second bitrate to the terminal includes: transmitting, in response to detecting that the network states of the transmission link all meet the network smoothness condition, the video stream transcoded according to the second bitrate to the terminal.

Specifically, when the server determines that the detected network states of the transmission link all meet the network smoothness condition, indicating that each redundancy increase may not cause network fluctuations, the server may transmit the video stream transcoded according to the second bitrate to the terminal.

In the above embodiments, during the multiple progressive adjustments, it is determined, according to whether the network states all meet the network smoothness condition, whether to make an adjustment to the second bitrate, and if the network states of the transmission link all meet the network smoothness condition, it indicates that the network states support the processing on the video stream with the second bitrate, so that high-quality or high-fluency viewing experience can be provided as much as possible.

In some embodiments, the in a case that the acquired network states meet a network smoothness condition, transmitting a video stream transcoded according to the second bitrate to the terminal includes: transmitting, in a case that the number of times it is detected that the network state of the transmission link meets the network smoothness condition reaches a preset threshold, the video stream transcoded according to the second bitrate to the terminal.

Specifically, during the multiple progressive adjustments, the server transcodes, in a case that the number of times it is detected that the network state of the transmission link meets the network smoothness condition reaches the preset threshold through detection or in a manner of transmitting a feedback message by the terminal, the video stream into the second bitrate and transmits the video stream to the terminal. For example, when the number of times the network smoothness condition is met exceeds a preset value, indicating that the network state can basically support the second bitrate, an attempt of adjustment to the second bitrate may also be made.

Therefore, during the multiple progressive adjustments, it is determined, according to the number of times the network state meets the network smoothness condition, whether to make an adjustment to the second bitrate, and when the number of times the network state meets the network smoothness condition is greater, it indicates that the number of times the network smoothness condition is not met may be caused by short-term network fluctuations, and an attempt of adjustment to the second bitrate may be made to provide high-quality or high-fluency viewing experience as much as possible.

In some embodiments, the in response to determining based on the network state that a bitrate adjustment is required, determining a second bitrate needing to be adjusted to, and performing multiple progressive adjustments, in a direction toward the second bitrate, on redundancy of video frames in the video stream transcoded according to the first bitrate includes: in response to determining based on the network state that a bitrate decrease is required and a first preset adjustment manner is adopted, determining the second bitrate needing to be decreased to, and performing multiple progressive decreases, in the direction toward the second bitrate, on the redundancy of video frames in the video stream transcoded according to the first bitrate.

Specifically, for the bitrate decrease, the processing of determining, by performing multiple progressive decreases on the redundancy of video frames in the video stream transcoded according to the first bitrate, whether to decrease to the target bitrate may be determined as the first preset adjustment manner. Specifically, if the server adopts the first preset adjustment manner when determining based on the network state that the bitrate decrease is required, the server may determine the second bitrate needing to be decreased to, and perform multiple progressive decreases, in the direction toward the second bitrate, on the redundancy of video frames in the video stream transcoded according to the first bitrate, so as to be compatible with the bitrate decrease based on the redundancy decrease manner and decrease to an appropriate bitrate in a scene where the bitrate can be flexibly switched, which ensures definition of the video screen while ensuring fluency.

When it is determined based on the network state of the transmission link that the bitrate decrease is required, indicating that the network state is currently limited, there is no need to perform multiple adjustments between each two adjacent bitrate levels progressively, and one or more levels may be directly lowered in the plurality of preset bitrate levels by using a second preset adjustment manner. In some embodiments, during the playback of the video stream by the terminal, the video stream bitrate adjustment method further includes: in response to determining based on the network state that the bitrate decrease is required and a second preset adjustment manner is adopted, from a plurality of preset bitrate levels, adjusting, starting from a bitrate corresponding to a bitrate level that is one level lower than the first bitrate, a bitrate of the video stream level by level, transmitting the video stream with the adjusted bitrate to the terminal until the network state information of the transmission link meets the network smoothness condition, and stopping adjusting the bitrate.

Specifically, when the terminal or the server determines based on the network state of the transmission link that the bitrate decrease is required and determines to adopt the second preset adjustment manner for the bitrate decrease, from the plurality of preset bitrate levels, the server adjusts, starting from a bitrate corresponding to a bitrate level that is one level lower than the first bitrate, the bitrate of the video stream level by level, and transmits the video stream with the adjusted bitrate to the terminal until the network state information of the transmission link meets the network smoothness condition, and the server stops adjusting the bitrate. The server may continuously transmit to the terminal the video stream transcoded according to the bitrate when the bitrate adjustment is stopped.

For example, assuming that a current playback bitrate is a super-definition bitrate, the server may first attempt to make an adjustment to high definition. If the network smoothness condition is met after the adjustment to high definition, the adjustment is stopped, the high definition bitrate is determined to be the second bitrate, and the video stream with the super-definition bitrate is converted into a video stream with the high-definition bitrate and transmitted to the terminal. If the network state still does not meet the network smoothness condition after the adjustment to high definition, the server continuously decreases the bitrate to standard definition and reconfirms whether the network smoothness condition is met.

Therefore, through the decrease of the bitrate level by level, a requirement for image quality can be met as much as possible while playback fluency is ensured, so as to improve viewing experience of the user.

In another embodiment, the video stream bitrate adjustment method further includes: in response to determining based on the network state that the bitrate decrease is required and a third preset adjustment manner is adopted, determining, based on the network state of the transmission link, a bitrate corresponding to a supported highest bitrate level from the plurality of preset bitrate levels; and transmitting a video stream transcoded according to the bitrate corresponding to the highest bitrate level to the terminal.

Specifically, when the terminal or the server determines based on the network state of the transmission link that the bitrate decrease is required and determines to adopt the third preset adjustment manner, the terminal or the server performs calculation according to network state information, such as calculation and evaluation of a link bandwidth capacity, to determine a bitrate at the highest level that can be supported under a current network condition. For example, the server evaluates the link bandwidth capacity according to the network state and determines the highest standard-definition bitrate that can be currently supported. If the video stream played back by the terminal is the super-definition bitrate, the server directly determines an adjustment to the standard-definition bitrate, converts the video stream with the super-definition bitrate into the standard-definition bitrate, and transmits the video stream to the terminal. That is, the server may directly transmit, to the terminal, the video stream transcoded according to the bitrate corresponding to the highest bitrate level.

Therefore, the most appropriate bitrate level is matched based on the network state and bitrate switching is performed, which can quickly realize adaptive adjustment of the bitrate under network fluctuations, and can prevent freezing during the bitrate switching, so that the user is unaware of the network fluctuations and viewing experience of the user is guaranteed.

In some embodiments, the transmitting a video stream transcoded according to the second bitrate to the terminal includes: acquiring the video stream transcoded according to the second bitrate, and determining a to-be-transmitted next first key frame from the acquired video stream; searching the video stream transcoded according to the first bitrate for a second key frame having a same timestamp as the first key frame; and in a case that the video stream transcoded according to the first bitrate is transmitted to the second key frame, switching to the video stream transcoded according to the second bitrate, and starting transmission from the first key frame to the terminal.

When transmitting the video stream transcoded according to the second bitrate to the terminal, the server may determine the to-be-transmitted next first key frame from the acquired video stream transcoded according to the second bitrate, and determine, from the video stream transcoded according to the first bitrate, the second key frame having the same timestamp as the first key frame. The server, when transmitting the video stream transcoded according to the first bitrate to the second key frame, switches the video stream to the video stream transcoded according to the second bitrate, and starts transmission from the first key frame to the terminal, so as to achieve seamless switching of a video bitrate.

Specifically, the server may acquire the video stream with the second bitrate in a manner of performing transcoding or initiating a request to the transcoding server. For distinction, a key frame in the video stream with the second bitrate is called the first key frame, and a key frame in a currently transmitted video stream with a playback bitrate is called the second key frame. The server finds the first key frame and the second key frame with a same timestamp from several first key frames and several second key frames, so as to align timestamps of the key frames. For the video playback scene, the timestamp corresponding to the video frame may refer to a certain moment in an entire video duration. For example, for a 25-minute video, the timestamp may indicate that 17:58 is the corresponding video frame in the video. For the livestreaming scene, the timestamp corresponding to the video frame may be a physical time, such as X:X:X. After the timestamps are aligned, the server switches the video stream to the second bitrate and transmits the video stream with the second bitrate to the terminal.

Specifically, the server still transmits the video stream with the first bitrate to the terminal at a current moment. The server determines the first key frame after the current moment in the video stream with the second bitrate, and searches for, in cached video streams with the first bitrate currently transmitted, whether there is a second key frame with a same timestamp as the first key frame after the current moment. If there is the second key frame with the same timestamp, the server is ready to switch the video stream to the second bitrate. That is, the server continuously transmits the video stream with the first bitrate to the terminal until the second key frame is transmitted, stops transmitting the original video stream with the first bitrate, switches to the first key frame corresponding to the second key frame, and transmits, from the first key frame, a subsequent video stream with the second bitrate to the terminal. That is, the server switches to the first key frame corresponding to the second key frame, and transmits the video stream with the second bitrate corresponding to a subsequent moment and including the first key frame. When the server transmits the video stream with the first bitrate until the second key frame is transmitted, video frames before the second key frame have been transmitted but the second key frame has not been transmitted.

For example, as shown in FIG. 4, assuming that a current moment is a moment T_1. After acquiring a video stream with a high bitrate, the server searches a cached video stream with a low bitrate, and finds that a first key frame and a second key frame with a same timestamp exist at a moment T_n. Therefore, the server continuously transmits the video stream with the low bitrate, including a video frame at a moment T_2, a video frame at a moment T_3, . . . until a key frame at the moment T_n is transmitted, and the server stops transmitting the video stream with the low bitrate and switches to the video stream with the high bitrate. That is, the server starts transmitting the video stream with the high bitrate (from the key frame at the moment T_n) to the terminal.

For example, as shown in FIG. 4, a bitrate is switched up in the livestreaming scene, and the content delivery server initiates a back-to-source operation to the transcoding server, receives a transcoded stream with the high bitrate, and then finds two I frames with a same timestamp in caches of the transcoded stream with the high bitrate and the video stream with the low bitrate, to complete alignment of timestamps of the I frames. After the alignment of the timestamps of the I frames, the content delivery server may switch the original bitrate to a new high bitrate, thereby achieving smooth and seamless switching of the bitrate of the video stream.

In the absence of the second key frame with the same timestamp, a requirement for an improvement in the image quality is higher in some cases. Then, when determining through search that there is no second key frame with the same timestamp, the server directly switches the video stream with the first bitrate to the second bitrate based on the first key frame and transmits the video stream to the terminal. Therefore, the bitrate of the video stream can be adaptively adjusted, and the bitrate can be quickly switched. Specifically, the server continuously transmits the video stream with the first bitrate to the terminal until a moment corresponding to the first key frame is reached, stops transmitting the original video stream with the first bitrate, switches to the first key frame, and transmits, from the first key frame, a subsequent video stream with the second bitrate to the terminal.

A requirement for fluency is higher in some other cases. Then, when determining through search that there is no second key frame with the same timestamp, the server may continuously transmit and cache the video stream with the current bitrate, and determine whether a next key frame in the video stream with the second bitrate can be timestamp aligned. If not, the server continuously determines a next key frame . . . until the timestamps are aligned, determines the first key frame and the second key frame whose timestamps are aligned, completes bitrate switching, and transmits the video stream with the second bitrate to the terminal. Therefore, it can be ensured that the video stream is played back fluently without freezing. Therefore, in the absence of the second key frame with the same timestamp, bitrate switching may be realized based on the next key frame in the video stream with the second bitrate, which can prevent repeated switching of the bitrate and greatly improve accuracy of the bitrate adjustment.

In the above embodiments, smooth and seamless switching of the bitrate of the video stream is achieved through timestamp alignment, and freezing and black screen may be absent when the terminal plays back a video, which greatly ensures viewing experience of the user.

In one embodiment, overall architecture may be shown in FIG. 5. For example, the server is a content delivery server (a CDN server), and a transmission link between the client and the CDN server includes a streaming media channel and a signaling channel. The client and the CDN server transmit a video stream through the streaming media channel, and implement communication interaction through the signaling channel, such as transmitting requests and feedback. The CDN server includes a stream switching decision-making module configured to determine, based on a network state of the transmission link acquired by the client through packet receiving feedback, whether a bitrate adjustment is required. When the stream switching decision-making module determines that a bitrate increase is required, a bitrate pre-increasing module progressively pre-increases the bitrate and determines a target bitrate after the adjustment if the network smoothness condition is met. The CDN server transcodes a video stream with a high rate back to source, and after receiving the video stream with the high rate, aligns timestamps of video frames (including, but not limited to, I frames) with different bitrates, thereby switching the video stream to a new bitrate. During the transcoding, transcoding may be performed based on a plurality of preset bitrate levels (such as standard definition, high definition, super definition, and 4 K), and timestamp alignment may be performed.

For example, when requesting playback, the client transmits a bitrate template (including specific information and parameters of the bitrate) and a playback bitrate (one of the plurality of preset bitrate levels) to the CDN server. The server (CDN) calculates and evaluates a network capacity in real time by sensing network changes, and when sensing that the network capacity is limited or the playback freezes, decreases the bitrate to transcode a low bitrate back to source, receives the low bitrate, aligns timestamps of the low bitrate and the current bitrate, and switches to a new low bitrate.

In another example, when the CDN server senses that the network capacity is increased or the playback freezing is restored, the pre-increasing module first progressively increases the bitrate by adding a certain proportion of redundancy when transmitting several frames, and observes a response of the transmission link. If the playback is continuously normal, a high bitrate is transcoded back to source. When receiving a high-bitrate stream, the CDN server switches to a new high bitrate through timestamp alignment to improve image quality.

When the client makes a decision, as shown in FIG. 6, for example, the server is still a content delivery server, and the client calculates and evaluates a network capacity in real time by sensing network changes, and when sensing that the network capacity is limited or the playback freezes, requests, through the signaling channel, the server to decrease the bitrate, to reduce a freezing rate. When the client senses that the network capacity is increased or the playback freezing is restored, the server is requested, through the signaling channel, to increase the bitrate to improve image quality.

For example, as shown in FIG. 7, it is assumed that the client transmits a WebRTC request, and the request carries all bitrate templates supported by the client (including 2000 Kbps, 1200 Kbps, 800 Kbps, and 550 Kbps) and bitrate levels, as well as a current playback bitrate. Assuming that a starting bitrate is 2000 Kbps, the client transmits packet feedback to the CDN server, the CDN server evaluates a link bandwidth, and if it is determined according to an evaluation result that the network capacity is insufficient, the stream switching decision-making module may progressively reduce the bitrate according to a supported bitrate template until the network smoothness condition is met. The stream switching decision-making module may alternatively directly match a most appropriate bitrate according to the network capacity. Assuming that the starting bitrate is 550

Kbps, the CDN server evaluates a link bandwidth capacity according to packet transmission feedback. When it is determined that the bitrate may be increased, the stream switching decision-making module attempts to increase the bitrate, which first increases an instantaneous bitrate by increasing redundancy of several frames starting from the I frame, then observes a link bandwidth evaluation result, . . . and progressively increases the redundancy of the several frames starting from the I frame multiple times. If there is a packet loss or another congestion signal midway, the process of pre-increasing the bitrate is exited. Otherwise, the bitrate is continuously progressively increased until the bitrate reaches a target bitrate (such as a previous bitrate level), and the bitrate may be officially increased after observation for a decision-making cycle (3-5 RTT). Then, the CDN server transcodes the video stream with the corresponding bitrate back to source, performs timestamp alignment, and transmits the video stream to the client.

After stream switching decision-making, the CDN server initiates a back-to-source operation to transcoding. After receiving a high-bitrate transcoded stream, the CDN server needs to find I frames with a same timestamp in caches of high-bitrate and low-bitrate video streams to complete alignment of timestamps of the I frames. After the alignment of the timestamps of the I frames, the CDN server may switch the original bitrate to a new high bitrate, thereby achieving smooth and seamless switching of the bitrate.

The present disclosure further provides an application scene. The above video stream bitrate adjustment method is applied to the application scene. Specifically, the application of the video stream bitrate adjustment method to the application scene is as follows: The user clicks to play back a video through the client installed on the terminal, to trigger the client to generate a playback request. The terminal requests, through the transmission link, acquiring a video stream from the server. In response to the playback request initiated by the terminal, the server transmits, through the transmission link, the video stream to the terminal, for the client to play back. During the playback of the video stream by the terminal, when it is determined based on a network state of the transmission link that a bitrate increase is required, the server progressively adjusts the redundancy of the video frame transmitted to the terminal multiple times until the bitrate corresponding to the adjusted video frame matches the target bitrate. In this process, if the network smoothness condition is met in each adjustment, the server converts the video stream into the target bitrate and transmits the video stream to the terminal. On the contrary, if a packet loss or a congestion signal is detected at any time, the process of progressively adjusting the redundancy may be exited, and the current playback bitrate on the client will be maintained unchanged.

Certainly, the present disclosure is not limited thereto. The video stream bitrate adjustment provided in the present disclosure may also be applied to other application scenes, such as cloud gaming and cloud classes/conferences.

Cloud gaming, which may also be referred to as gaming on demand, is an online gaming technology based on the cloud computing technology. In a cloud gaming scene, a game is not run on a game terminal of a player, but in a cloud server, and the cloud server renders a game scene into video/audio streams, and transmits the video/audio streams to the game terminal of the player through a network. The game terminal of the player does not need to have strong graphics computing and data processing capabilities, but only needs to have a basic streaming media playback capability and a capability to acquire input instructions of the player and transmit the input instructions of the player to the cloud server. During the cloud gaming, bitrates of the video/audio streams may be adaptively adjusted and switched.

Figure 8:
FIG. 8 is a schematic diagram of an interface of a client according to an embodiment.
Figure 9:
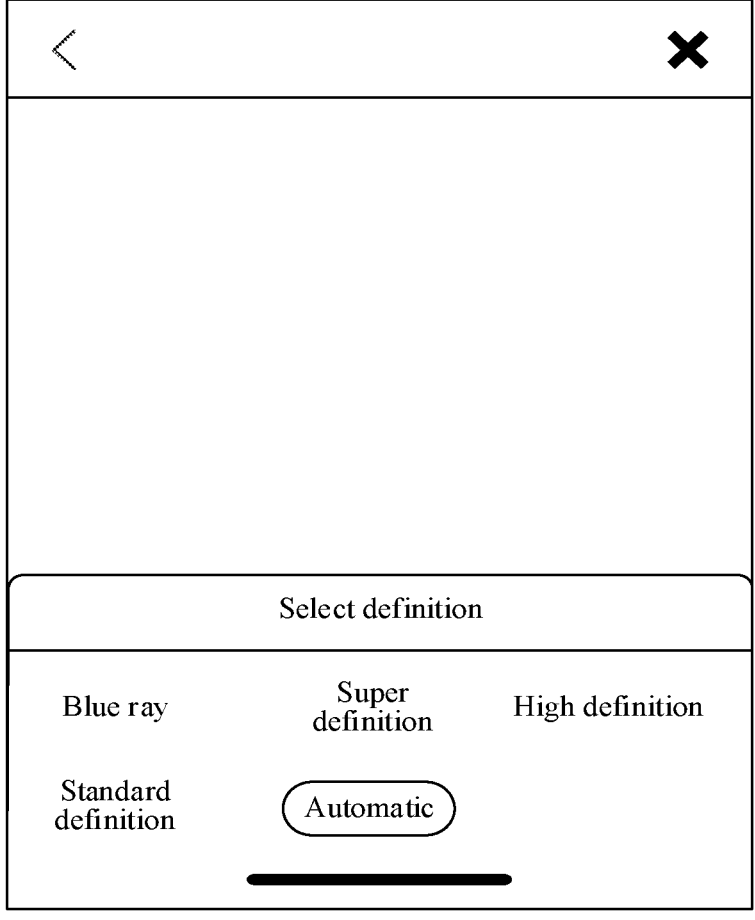
FIG. 9 is a schematic diagram of an interface of a client according to another embodiment.

In an actual application scene, for a web client as shown in FIG. 8 or an APP client as shown in FIG. 9, the client may provide a selection menu of definition (or image quality) on a video window page, and a user may trigger the selection menu and select one option to select corresponding video definition (or image quality). In an application scene of the present disclosure, an adaptive bitrate option (such as "automatic" or "adaptive" option) may be provided in the selection menu, and after the user selects the option, a bitrate and resolution may be adaptively adjusted based on a network state when the client plays back the video stream, and a smooth and seamless connection may be achieved during bitrate switching, leaving the user unaware.

In an e-commerce livestreaming scene, livestreaming viewing experience can be significantly improved by an adaptive bitrate adjustment. For users with good network states, the image quality can be improved by a bitrate increase, which can better display details of e-commerce products and help increase conversion rates. For users with poor network states, experience of livestreaming fluency can be improved by a bitrate decrease.

In one example, taking a livestreaming scene as an example, a live stream host starts livestreaming at an original bitrate through a client (corresponding to a collection end) installed on the terminal, and a video stream collected by the client is pushed to the server. The content delivery server may establish transmission links with one or more user terminals.

In some embodiments, the video stream collected by the collection end is pushed to a source station, and the source station collects and stores the stream to facilitate subsequent delivery. The source station may alternatively transcode the video stream with the original bitrate in real time according to a stream pulling request from the content delivery server to obtain a video stream with a certain bitrate, such as standard definition, high definition, super definition, or 2K.

In another embodiment, the content delivery server may perform transcoding. A step of performing transcoding by the source station or the content delivery server includes, for example, encoding video frames in the video stream by video encoding and compression, and changing a bitrate of the video stream by changing encoding parameters (such as definition or bitrates) corresponding to the video frames.

When the user wants to watch a live video of the live stream host, the user triggers the client to instruct the terminal to transmit a playback request to the content delivery server. The playback request carries a playback bitrate selected by the user or set on the client by default. According to the playback bitrate, the content delivery server may request the video stream with the corresponding bitrate from the source station, or may obtain the video stream with the corresponding bitrate by transcoding, and then transmit the video stream at the playback bitrate to the client. The client receives and plays back the video stream.

During the playback, the client or the content delivery server may determine, according to a network state of the transmission link therebetween, whether the bitrate of the video stream played back by the client needs to be increased or decreased. The network state may be evaluated by the client or by the content delivery server.

In some embodiments, the content delivery server transmits the video stream to the client through the streaming media channel, and at the same time, transmits, to the client through the signaling channel, a detection message for acquiring network state information. After receiving the detection message through the signaling channel, the client detects the network state of the transmission link to obtain the network state information, encapsulates the network state information into a feedback message, and transmits the feedback message to the content delivery server. After parsing the feedback message, the content delivery server obtains the network state information, and then may evaluate the network state of the transmission link.

In another embodiment, during the playback of the video stream, the client may detect the network state in real time and obtain the network state information, and when determining that the bitrate may be increased or decreased, transmit a request to the content delivery server through the signaling channel, to enable the content delivery server to perform a video stream bitrate adjustment step.

When the bitrate needs to be increased, for the video stream with the current bitrate, the content delivery server, starting from a following first I frame, increases, for several frames (whose quantity is no greater than a quantity of a group of GOPs) including the I frame, redundancy to increase an instantaneous bitrate in an attempt to pre-increase the bitrate, and then observes changes in the network state. The content delivery server progressively increases the redundancy of the video frame multiple times, and if a packet loss or another congestion signal is detected at any time midway, exits the process of pre-increasing the bitrate. Otherwise, the content delivery server continuously progressively increases the redundancy to increase the bitrate until the bitrate reaches a bitrate corresponding to a previous bitrate level. Then, the content delivery server may perform observation within a decision-making cycle (for example, 3-5 RTT), and start to officially increase the bitrate if the network situation is good in this cycle. After determining to increase the bitrate, the content delivery server may request a video stream with the corresponding bitrate from the source station, or initiate a back-to-source operation to the transcoding server. After receiving the video stream with the corresponding bitrate, the content delivery server may search the cache for I frames with a same timestamp to perform a step of aligning timestamps of the I frames. When the I frames with the same timestamp are found, timestamp alignment is completed, and the content delivery server switches the video stream and transmits a new video stream after the switching to the client, so as to smoothly and seamlessly switch the originally transmitted video stream to a video stream with a new bitrate. When the I frames with the same timestamp are not found, the content delivery server may continuously search for a next I frame and align timestamps, or the content delivery server may directly switch the video stream according to the next I frame.

When the bitrate needs to be decreased, in some embodiments, the client acquires network state information and determines the network state to determine whether the bitrate needs to be decreased. If yes, the client transmits a request to the content delivery server by using the signaling channel. The content delivery server switches down one or more levels. In another embodiment, the content delivery server acquires the network state information according to a feedback message transmitted by the client, to obtain the network state, and determines accordingly whether the bitrate needs to be decreased. If yes, the content delivery server determines to switch down one or more levels, or directly switches to an optimal bitrate in the current network state.

It is to be understood that, although the steps in the flowcharts of the embodiments above are shown sequentially as indicated by the arrows, these steps are not necessarily performed sequentially according to the sequence indicated by the arrows. Unless otherwise explicitly specified herein, execution of the steps is not strictly limited, and the steps may be performed in other sequences. Moreover, at least some of the steps in the flowcharts of the embodiments above may include a plurality of steps or a plurality of stages. The steps or stages are not necessarily performed at the same moment but may be performed at different moments. The steps or stages are not necessarily sequentially performed, but may be performed in turn or alternately with other steps or at least some of steps or stages of other steps.

Based on a same inventive concept, an embodiment of the present disclosure further provides a video stream bitrate adjustment apparatus configured to implement the foregoing video stream bitrate adjustment method. The implementation solution provided by the apparatus to solve the problem is similar to the implementation solution described in the above method. Therefore, specific limitations in one or more embodiments of the video stream bitrate adjustment apparatus provided below may be obtained with reference to the limitations on the video stream bitrate adjustment method above. Details are not described herein again.

Figure 10:
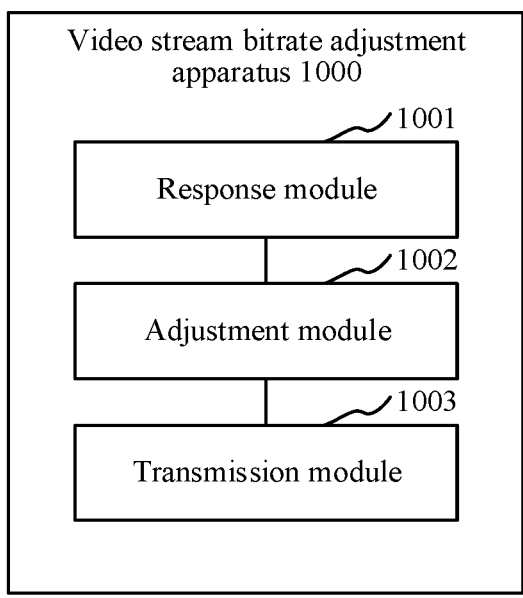
FIG. 10 is a structural block diagram of a video stream bitrate adjustment apparatus according to an embodiment.

In some embodiments, as shown in FIG. 10, a video stream bitrate adjustment apparatus 1000 is provided, including: a response module 1001, an adjustment module 1002, and a transmission module 1003.

The response module 1001 is configured to, in response to a playback request initiated by a terminal, transmit, through a transmission link, a video stream transcoded according to a first bitrate to the terminal.

The adjustment module 1002 is configured to detect a network state of the transmission link, and in response to determining based on the network state that a bitrate adjustment is required, determine a second bitrate needing to be adjusted to, and perform multiple progressive adjustments, in a direction toward the second bitrate, on redundancy of video frames in the video stream transcoded according to the first bitrate.

The transmission module 1003 is configured to acquire network states of the transmission link during the multiple progressive adjustments, and in a case that the acquired network states meet a network smoothness condition, transmit a video stream transcoded according to the second bitrate to the terminal.

In some embodiments, the response module is further configured to, in response to the playback request initiated by the terminal, acquire, based on the first bitrate carried in the playback request, the video stream transcoded according to the first bitrate; where the first bitrate is a preset bitrate corresponding to a preset bitrate level; and transmit the video stream transcoded according to the first bitrate to the terminal through the transmission link.

In some embodiments, the response module is further configured to acquire a video stream with an original bitrate, adjust an encoding parameter in the video stream with the original bitrate based on the first bitrate, and transcode the video stream with the original bitrate to obtain the video stream transcoded according to the first bitrate.

In some embodiments, the response module is further configured to transmit a transcoding request to a transcoding server, the transcoding request being used for instructing the transcoding server to provide the video stream transcoded according to the first bitrate; and receive the video stream transcoded according to the first bitrate and transmitted by the transcoding server.

In some embodiments, the adjustment module 1002 is further configured to receive a feedback message transmitted by the terminal; the feedback message carrying network state information; extract network state information of the transmission link from the feedback message; and determine the network state of the transmission link according to the network state information.

In some embodiments, the adjustment module 1002 is further configured to determine, in response to receiving a bitrate adjustment request transmitted by the terminal, the network state of the transmission link according to the bitrate adjustment request; where the bitrate adjustment request is generated in a case that the terminal detects that network state information meets a bitrate adjustment condition, the network state information being detected by the terminal during playback of the video stream transcoded according to the first bitrate.

In some embodiments, the adjustment module is further configured to, in response to determining based on the network state of the transmission link that a bitrate increase is required, determine the second bitrate needing to be increased to, and increase, in the direction toward the second bitrate, the redundancy of the video frames in the video stream transcoded according to the first bitrate; transmit the video frames with the increased redundancy to the terminal; and acquire a latest network state of the transmission link, and in a case that the latest network state meets the network smoothness condition, continuously increase, in the direction toward the second bitrate, the redundancy of the video frames in the video stream transcoded according to the first bitrate until the latest network state does not meet the network smoothness condition, or a bitrate corresponding to the video frames with the increased redundancy reaches the second bitrate.

In some embodiments, the adjustment module is further configured to determine, from an initial key frame not transmitted in the video stream transcoded according to the first bitrate, a plurality of video frames starting from the initial key frame; and adjust redundancy encoding parameters of the plurality of video frames in an adjustment manner of increasing redundancy, to obtain the video frames with the increased redundancy.

In some embodiments, the above apparatus further includes an exit module configured to, during the multiple progressive adjustments on the redundancy of the video frames, in response to detecting that the network state of the transmission link does not meet the network smoothness condition, stop adjusting the redundancy of the video frames, and keep transmitting the video stream transcoded according to the first bitrate to the terminal.

In some embodiments, the transmission module is further configured to transmit, in a case that a number of times it is detected that the network state of the transmission link meets the network smoothness condition is higher than a number of times it is detected that the network state does not meet the network smoothness condition, the video stream transcoded according to the second bitrate to the terminal.

In some embodiments, the transmission module is further configured to transmit, in response to detecting that the network states of the transmission link all meet the network smoothness condition, the video stream transcoded according to the second bitrate to the terminal.

In some embodiments, the transmission module is further configured to transmit, in a case that the number of times it is detected that the network state of the transmission link meets the network smoothness condition reaches a preset threshold, the video stream transcoded according to the second bitrate to the terminal.

In some embodiments, the adjustment module 1002 is further configured to, in response to determining based on the network state that a bitrate decrease is required and a first preset adjustment manner is adopted, determine the second bitrate needing to be decreased to, and perform multiple progressive decreases, in the direction toward the second bitrate, on the redundancy of video frames in the video stream transcoded according to the first bitrate.

In some embodiments, the adjustment module 1002 is further configured to, in response to determining based on the network state that the bitrate decrease is required and a second preset adjustment manner is adopted, from a plurality of preset bitrate levels, adjust, starting from a bitrate corresponding to a bitrate level that is one level lower than the first bitrate, a bitrate of the video stream level by level, transmit the video stream with the adjusted bitrate to the terminal until the network state information of the transmission link meets the network smoothness condition, and stop adjusting the bitrate.

In some embodiments, the above apparatus further includes a decrease module configured to, in response to determining based on the network state that the bitrate decrease is required and a third preset adjustment manner is adopted, determine, based on the network state of the transmission link, a bitrate corresponding to a supported highest bitrate level from the plurality of preset bitrate levels; and transmit a video stream transcoded according to the bitrate corresponding to the highest bitrate level to the terminal.

In some embodiments, the transmission module is further configured to acquire the video stream transcoded according to the second bitrate, and determine a to-be-transmitted next first key frame from the acquired video stream; search the video stream transcoded according to the first bitrate for a second key frame having a same timestamp as the first key frame; and in a case that the video stream transcoded according to the first bitrate is transmitted to the second key frame, switch to the video stream transcoded according to the second bitrate, and start transmission from the first key frame to the terminal.

All or some of modules in the above video stream bitrate adjustment may be implemented entirely or partially through software, hardware, or a combination thereof. The foregoing modules may be built in or independent of a processor of a computer device in a form of hardware, or may be stored in a memory of the computer device in a form of software, so that the processor invokes and performs an operation corresponding to each of the foregoing modules.

In some embodiments, a computer device is provided. The computer device may be used as the server or the terminal in the foregoing embodiments. For example, the computer device is server, and an internal structure diagram thereof may be shown in FIG. 11. The computer device includes a processor, a memory, an input/output (I/O) interface, and a communication interface. The processor, the memory, and the I/O interface are connected through a system bus, and the communication interface is connected to the system bus through the I/O interface. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for execution of the operating system and the computer-readable instructions in the non-volatile storage medium. The database of the computer device is configured to store video stream data. The I/O interface of the computer device is configured to exchange information between the processor and the external device. The communication interface of the computer device is configured to connect and communicate with an external terminal through a network. The computer-readable instructions are executed to implement a video stream bitrate adjustment method.

Figure 11:
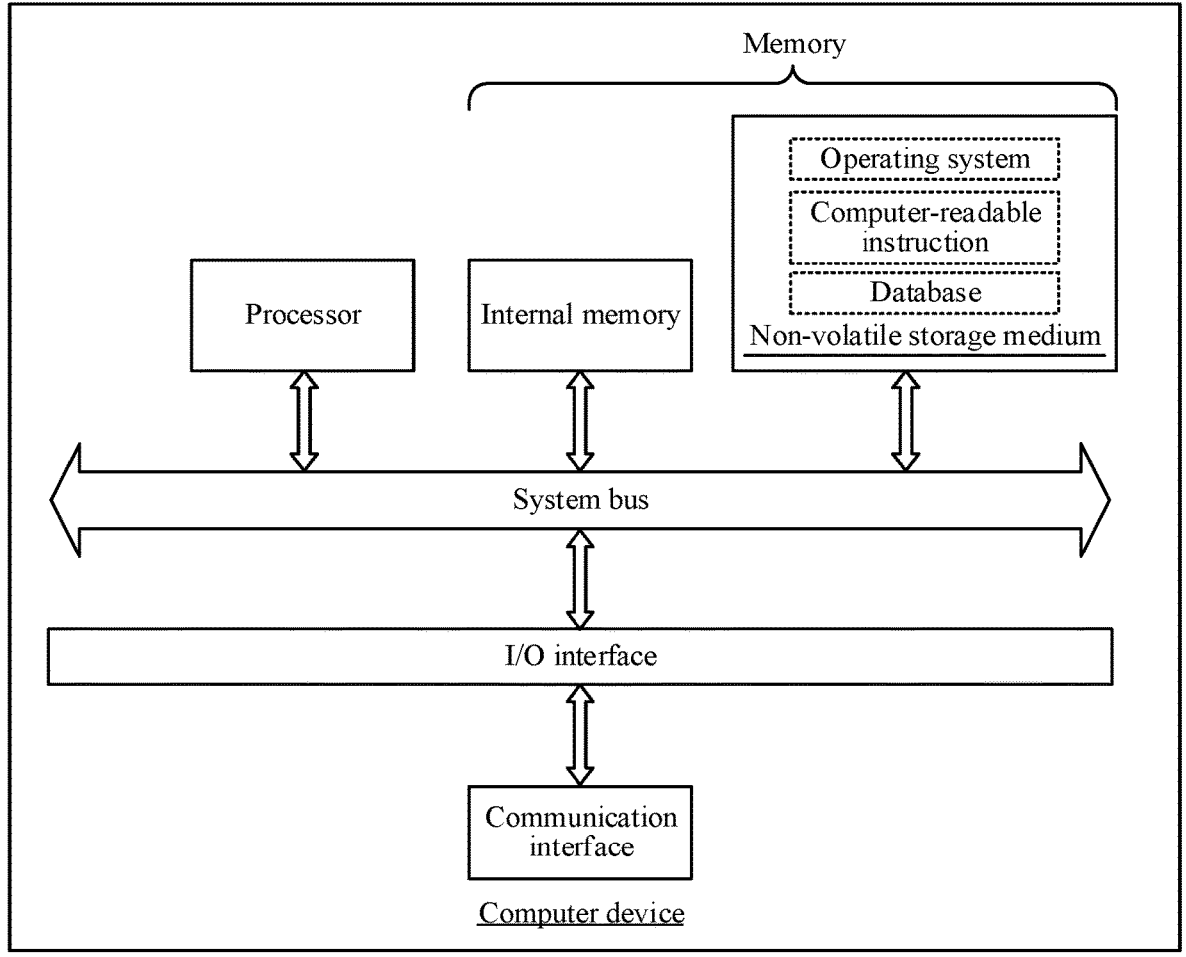
FIG. 11 is a diagram of an internal structure of a computer device according to an embodiment.

A person skilled in the art may understand that, the structure shown in FIG. 11 is merely a block diagram of a partial structure related to the solution in the present disclosure, and does not constitute a limitation on the computer device to which the solution in the present disclosure is applied. Specifically, the computer device may include more components or fewer components than those shown in the figure, or some components may be combined, or a different component deployment may be used.

In some embodiments, a computer device is further provided, including: a memory and a processor. The memory stores computer-readable instructions. The processor implements the steps in the foregoing method embodiments when executing the computer-readable instructions.

In some embodiments, a computer-readable storage medium is provided, storing computer-readable instructions. The computer-readable instructions, when executed by a processor, implement the steps in the foregoing method embodiments.

In some embodiments, a computer program product is provided, including computer-readable instructions. The computer-readable instructions, when executed by a processor, implement the steps in the foregoing method embodiments.

A person of ordinary skill in the art may understand that all or some of procedures of the method in the foregoing embodiments may be implemented by computer-readable instructions instructing relevant hardware. The computer-readable instructions may be stored in a non-volatile computer-readable storage medium. When the computer-readable instructions are executed, the procedures of the foregoing method embodiments may be implemented. Any reference to a memory, a database, or another medium used in the embodiments provided in the present disclosure may include at least one of a non-volatile memory and a volatile memory. The non-volatile memory may include a read-only memory (ROM) a magnetic tape, a floppy disk, a flash memory, an optical memory, a high density embedded non-volatile memory, a resistive memory (ReRAM), a magnetoresistive random access memory (MRAM), a magnetoresistive random access memory (FRAM), a phase change memory (PCM), a graphene memory, and the like. The non-volatile memory may include a random access memory (RAM) or an external cache memory. By way of description and not limitation, the RAM may be in various forms, such as a static random access memory (SRAM), a dynamic random access memory (DRAM), or the like. The databases involved in the embodiments provided in the present disclosure may include at least one of a relational database and a non-relational database. The non-relational database may include a blockchain-based distributed database, but is not limited thereto. The processor involved in the embodiments provided in the present disclosure may be a general-purpose processor, a central processing unit, a graphics processing unit, a digital signal processor, a programmable logic device, a data processing logic device based on quantum computing, and the like, but is not limited thereto.

Technical features of the foregoing embodiments may be combined in different manners to form other embodiments. To make the description concise, not all possible combinations of the technical features in the foregoing embodiments are described. However, the combinations of these technical features shall be considered as falling within the scope recorded by this specification provided that no conflict exists.

The foregoing embodiments show only several implementations of the present disclosure and are described in detail, which, however, are not to be construed as a limitation on the patent scope of the present disclosure. For a person of ordinary skill in the art, several transformations and improvements can be made without departing from the concept of the present disclosure. These transformations and improvements fall within the protection scope of the present disclosure. Therefore, the protection scope of the present disclosure shall be subject to the appended claims.

What is claimed is:

1. A video stream bitrate adjustment method, performed by a computer device, the method comprising:

in response to a playback request initiated by a terminal, transmitting, through a transmission link, a video stream transcoded according to a first bitrate to the terminal;

detecting a first network state of the transmission link, and in response to determining based on the first network state that a bitrate adjustment is required, determining a second bitrate to be adjusted to;

performing multiple progressive adjustments, in a direction toward the second bitrate, on redundancy of video frames in the video stream transcoded according to the first bitrate, wherein each of the multiple progressive adjustments on the redundancy of the video frames comprises an adjustment of a quantity of redundant packets for every predetermined number of source packets corresponding to the video frames; and acquiring second network states of the transmission link during the multiple progressive adjustments, and in response to that the second network states meet a network smoothness condition, transmitting a video stream transcoded according to the second bitrate to the terminal.

2. The method according to claim 1, wherein the in response to a playback request initiated by a terminal, transmitting, through a transmission link, a video stream transcoded according to a first bitrate to the terminal comprises:

in response to the playback request initiated by the terminal, acquiring, based on the first bitrate carried in the playback request, the video stream transcoded according to the first bitrate; wherein the first bitrate is a preset bitrate corresponding to a preset bitrate level; and transmitting the video stream transcoded according to the first bitrate to the terminal through the transmission link.

3. The method according to claim 2, wherein the acquiring the video stream transcoded according to the first bitrate comprises:

acquiring a video stream with an original bitrate, adjusting an encoding parameter in the video stream with the original bitrate based on the first bitrate, and transcoding the video stream with the original bitrate to obtain the video stream transcoded according to the first bitrate.

4. The method according to claim 2, wherein the acquiring the video stream transcoded according to the first bitrate comprises:

transmitting a transcoding request to a transcoding server, the transcoding request being configured to instruct the transcoding server to provide the video stream transcoded according to the first bitrate; and receiving the video stream transcoded according to the first bitrate and transmitted by the transcoding server.

5. The method according to claim 1, wherein, the detecting a first network state of the transmission link comprises:

receiving a feedback message transmitted by the terminal; the feedback message carrying network state information;

extracting network state information of the transmission link from the feedback message; and determining the first network state of the transmission link according to the network state information.

6. The method according to claim 1, wherein, the detecting a first network state of the transmission link comprises:

determining, in response to receiving a bitrate adjustment request transmitted by the terminal, the first network state of the transmission link according to the bitrate adjustment request;

wherein the bitrate adjustment request is generated in response to the terminal detecting that network state information meets a bitrate adjustment condition, the network state information being detected by the terminal during playback of the video stream transcoded according to the first bitrate.

7. The method according to claim 1, wherein, the in response to determining based on the first network state that a bitrate adjustment is required, determining a second bitrate to be adjusted to, and performing multiple progressive adjustments, in a direction toward the second bitrate, on redundancy of video frames in the video stream transcoded according to the first bitrate comprises:

in response to determining based on the first network state of the transmission link that a bitrate increase is required, determining the second bitrate to be increased to, and increasing, in the direction toward the second bitrate, the redundancy of the video frames in the video stream transcoded according to the first bitrate;

transmitting the video frames with the increased redundancy to the terminal; and continuously acquiring a latest network state of the transmission link, and in a case that the latest network state meets the network smoothness condition, continuously increasing, in the direction toward the second bitrate, the redundancy of the video frames in the video stream transcoded according to the first bitrate until the latest network state does not meet the network smoothness condition, or a bitrate corresponding to the video frames with the increased redundancy reaches the second bitrate.

8. The method according to claim 7, wherein the increasing the redundancy of the video frames in the video stream transcoded according to the first bitrate comprises:

determining, from an initial key frame not transmitted in the video stream transcoded according to the first bitrate, a plurality of video frames starting from the initial key frame; and adjusting redundancy encoding parameters of the plurality of video frames in an adjustment manner of increasing redundancy, to obtain the video frames with the increased redundancy.

9. The method according to claim 1, wherein, the method further comprises:

during the multiple progressive adjustments on the redundancy of the video frames, in response to detecting that at least one of the second network states of the transmission link does not meet the network smoothness condition, stopping adjusting the redundancy of the video frames, and keeping transmitting the video stream transcoded according to the first bitrate to the terminal.

10. The method according to claim 1, wherein, the in response to that the second network states meet a network smoothness condition, transmitting a video stream transcoded according to the second bitrate to the terminal comprises:

transmitting, in a case that a number of the second network states of the transmission link meeting the network smoothness condition is higher than a number of second network states not meeting the network smoothness condition, the video stream transcoded according to the second bitrate to the terminal.

11. The method according to claim 1, wherein, the in a case that the second network states meet a network smoothness condition, transmitting a video stream transcoded according to the second bitrate to the terminal comprises:

transmitting, in response to detecting that all of the second network states of the transmission link meet the network smoothness condition, the video stream transcoded according to the second bitrate to the terminal.

12. The method according to claim 1, wherein, the in a case that the second network states meet a network smoothness condition, transmitting a video stream transcoded according to the second bitrate to the terminal comprises:

transmitting, in a case that a number of the second network states of the transmission link meeting the network smoothness condition reaches a preset threshold, the video stream transcoded according to the second bitrate to the terminal.

13. The method according to claim 1, wherein, the in response to determining based on the first network state that a bitrate adjustment is required, determining a second bitrate to be adjusted to, and performing multiple progressive adjustments, in a direction toward the second bitrate, on redundancy of video frames in the video stream transcoded according to the first bitrate comprises:

in response to determining based on the first network state that a bitrate decrease is required and a first preset adjustment manner is adopted, determining the second bitrate to be decreased to, and performing multiple progressive decreases, in the direction toward the second bitrate, on the redundancy of video frames in the video stream transcoded according to the first bitrate.

14. The method according to claim 13, wherein the method further comprises:

in response to determining based on the first network state that the bitrate decrease is required and a second preset adjustment manner is adopted, from a plurality of preset bitrate levels, adjusting, starting from a bitrate corresponding to a bitrate level that is one level lower than the first bitrate, a bitrate of the video stream level by level, transmitting the video stream with the adjusted bitrate to the terminal until the network state information of the transmission link meets the network smoothness condition, and stopping adjusting the bitrate.

15. The method according to claim 13, wherein the method further comprises:

in response to determining based on the first network state that the bitrate decrease is required and a third preset adjustment manner is adopted, determining, based on the first network state of the transmission link, a bitrate corresponding to a supported highest bitrate level from the plurality of preset bitrate levels; and transmitting a video stream transcoded according to the bitrate corresponding to the highest bitrate level to the terminal.

16. The method according to claim 1, wherein the transmitting a video stream transcoded according to the second bitrate to the terminal comprises:

acquiring the video stream transcoded according to the second bitrate, and determining a to-be-transmitted next first key frame from the acquired video stream;

searching the video stream transcoded according to the first bitrate for a second key frame having a same timestamp as the first key frame; and in a case that the video stream transcoded according to the first bitrate is transmitted to the second key frame, switching to the video stream transcoded according to the second bitrate, and starting transmission from the first key frame to the terminal.

17. A video stream bitrate adjustment apparatus, comprising:

at least one memory and at least one processor, the at least one memory storing computer-readable instructions, and the at least one processor, when executing the computer-readable instructions, implementing:

in response to a playback request initiated by a terminal, transmitting, through a transmission link, a video stream transcoded according to a first bitrate to the terminal;

detecting a first network state of the transmission link, and in response to determining based on the first network state that a bitrate adjustment is required, determining a second bitrate to be adjusted to;

performing multiple progressive adjustments, in a direction toward the second bitrate, on redundancy of video frames in the video stream transcoded according to the first bitrate, wherein each of the multiple progressive adjustments on the redundancy of the video frames comprises an adjustment of a quantity of redundant packets for every predetermined number of source packets corresponding to the video frames; and acquiring second network states of the transmission link during the multiple progressive adjustments, and in response to that the second network states meet a network smoothness condition, transmitting a video stream transcoded according to the second bitrate to the terminal.

18. The apparatus according to claim 17, wherein the in response to a playback request initiated by a terminal, transmitting, through a transmission link, a video stream transcoded according to a first bitrate to the terminal comprises:

in response to the playback request initiated by the terminal, acquiring, based on the first bitrate carried in the playback request, the video stream transcoded according to the first bitrate; wherein the first bitrate is a preset bitrate corresponding to a preset bitrate level; and transmitting the video stream transcoded according to the first bitrate to the terminal through the transmission link.

19. The apparatus according to claim 18, wherein the acquiring the video stream transcoded according to the first bitrate comprises:

acquiring a video stream with an original bitrate, adjusting an encoding parameter in the video stream with the original bitrate based on the first bitrate, and transcoding the video stream with the original bitrate to obtain the video stream transcoded according to the first bitrate.

20. A non-transitory computer-readable storage medium, storing computer-readable instructions, the computer-readable instructions, when being executed by at least one processor, causing the at least one processor to implement:

in response to a playback request initiated by a terminal, transmitting, through a transmission link, a video stream transcoded according to a first bitrate to the terminal;

detecting a first network state of the transmission link, and in response to determining based on the first network state that a bitrate adjustment is required, determining a second bitrate to be adjusted to;

performing multiple progressive adjustments, in a direction toward the second bitrate, on redundancy of video frames in the video stream transcoded according to the first bitrate, wherein each of the multiple progressive adjustments on the redundancy of the video frames comprises an adjustment of a quantity of redundant packets for every predetermined number of source packets corresponding to the video frames; and acquiring second network states of the transmission link during the multiple progressive adjustments, and in response to that the second network states meet a network smoothness condition, transmitting a video stream transcoded according to the second bitrate to the terminal.

\* \* \* \* \*